United States Patent
Pionetti et al.

(10) Patent No.: US 10,562,235 B2
(45) Date of Patent: Feb. 18, 2020

(54) METHOD FOR ASSEMBLING TUBULAR JOINING SLEEVE AND A CONDUIT LINING TUBE BY LASER WELDING

(71) Applicant: SAIPEM S.A., Montigny le Bretonneux (FR)

(72) Inventors: François-Régis Pionetti, La Baleine (FR); François Lirola, Courbevoie (FR); Taoufik Majdoub, Bobigny (FR)

(73) Assignee: Saipem S.A., Montigny Le Bretonneux (FR)

( * ) Notice: Subject to any disclaimer, the term of this patent is extended or adjusted under 35 U.S.C. 154(b) by 138 days.

(21) Appl. No.: 15/762,499

(22) PCT Filed: Sep. 21, 2016

(86) PCT No.: PCT/FR2016/052392
§ 371 (c)(1),
(2) Date: Mar. 22, 2018

(87) PCT Pub. No.: WO2017/051118
PCT Pub. Date: Mar. 30, 2017

(65) Prior Publication Data
US 2018/0272616 A1  Sep. 27, 2018

(30) Foreign Application Priority Data

Sep. 23, 2015  (FR) ..................... 15 58960

(51) Int. Cl.
*B29C 65/16* (2006.01)
*F16L 47/02* (2006.01)
(Continued)

(52) U.S. Cl.
CPC ........ *B29C 65/1635* (2013.01); *B23K 26/106* (2013.01); *B29C 65/1654* (2013.01);
(Continued)

(58) Field of Classification Search
CPC .... B23K 26/02; B23K 26/103; B23K 26/106; B23K 26/282; B23K 2101/10; B29C 65/16; B29C 65/1609; B29C 65/1612; B29C 65/1635; B29C 65/1654; B29C 65/1658; B29C 65/1677; B29C 65/1687; B29C 65/8253; B29C 66/1122; B29C 66/1142; B29C 66/1162; B29C 66/1222;
(Continued)

(56) References Cited

U.S. PATENT DOCUMENTS

| | | | |
|---|---|---|---|
| 5,196,671 A | 3/1993 | Kroehnert | |
| 2013/0114945 A1* | 5/2013 | Pionetti | F16L 1/15 392/472 |
| 2014/0326411 A1 | 11/2014 | Konita | |

FOREIGN PATENT DOCUMENTS

| | | |
|---|---|---|
| DE | 198 44 760 | 3/2000 |
| EP | 0 300 458 | 1/1989 |

(Continued)

*Primary Examiner* — Michael A Tolin
(74) *Attorney, Agent, or Firm* — Cozen O'Connor

(57) ABSTRACT

The present invention relates to a method and to a device for assembling together two tubes (1, 2) comprising a tubular junction sleeve and an internal pipe liner tube made of thermoplastic materials by laser welding two contact surfaces of revolution (1-1, 2-1) pressed one against the other at the ends of the tubular sleeve of said liner tube overlapping coaxially.

17 Claims, 13 Drawing Sheets

(51) Int. Cl.
 *B29C 65/82* (2006.01)
 *B29C 65/00* (2006.01)
 *B23K 26/10* (2006.01)
 *B29K 507/04* (2006.01)
 *B29D 23/00* (2006.01)
 *B29L 23/00* (2006.01)

(52) U.S. Cl.
 CPC ...... *B29C 65/1677* (2013.01); *B29C 65/8253* (2013.01); *B29C 66/1122* (2013.01); *B29C 66/1142* (2013.01); *B29C 66/1222* (2013.01); *B29C 66/1224* (2013.01); *B29C 66/1226* (2013.01); *B29C 66/14* (2013.01); *B29C 66/5221* (2013.01); *B29C 66/5229* (2013.01); *B29C 66/612* (2013.01); *B29C 66/634* (2013.01); *B29C 66/652* (2013.01); *B29C 66/71* (2013.01); *B29C 66/73921* (2013.01); *B29C 66/81267* (2013.01); *B29C 66/81455* (2013.01); *F16L 47/02* (2013.01); *B29D 23/003* (2013.01); *B29K 2507/04* (2013.01); *B29K 2995/0027* (2013.01); *B29L 2023/22* (2013.01)

(58) Field of Classification Search
 CPC ............ B29C 66/1224; B29C 66/1226; B29C 66/1282; B29C 66/14; B29C 66/348; B29C 66/5221; B29C 66/5229; B29C 66/612; B29C 66/634; B29C 66/652; B29C 66/71; B29C 66/73921; B29C 66/81267; B29C 66/81455; B29D 23/003; B29K 2023/06; B29K 2023/12; B29K 2027/16; B29K 2995/0026; B29L 2023/22; B29L 2031/24; F16L 47/02
 See application file for complete search history.

(56) References Cited

FOREIGN PATENT DOCUMENTS

| | | |
|---|---|---|
| EP | 0 722 824 | 7/1996 |
| EP | 0 852 984 | 7/1998 |
| FR | 2 382 970 | 10/1978 |
| FR | 2 963 654 | 2/2012 |
| JP | S60 60497 | 4/1985 |
| JP | 2011 240669 | 12/2011 |
| WO | WO 2010/041016 | 4/2010 |
| WO | WO 2012/017171 | 2/2012 |

\* cited by examiner

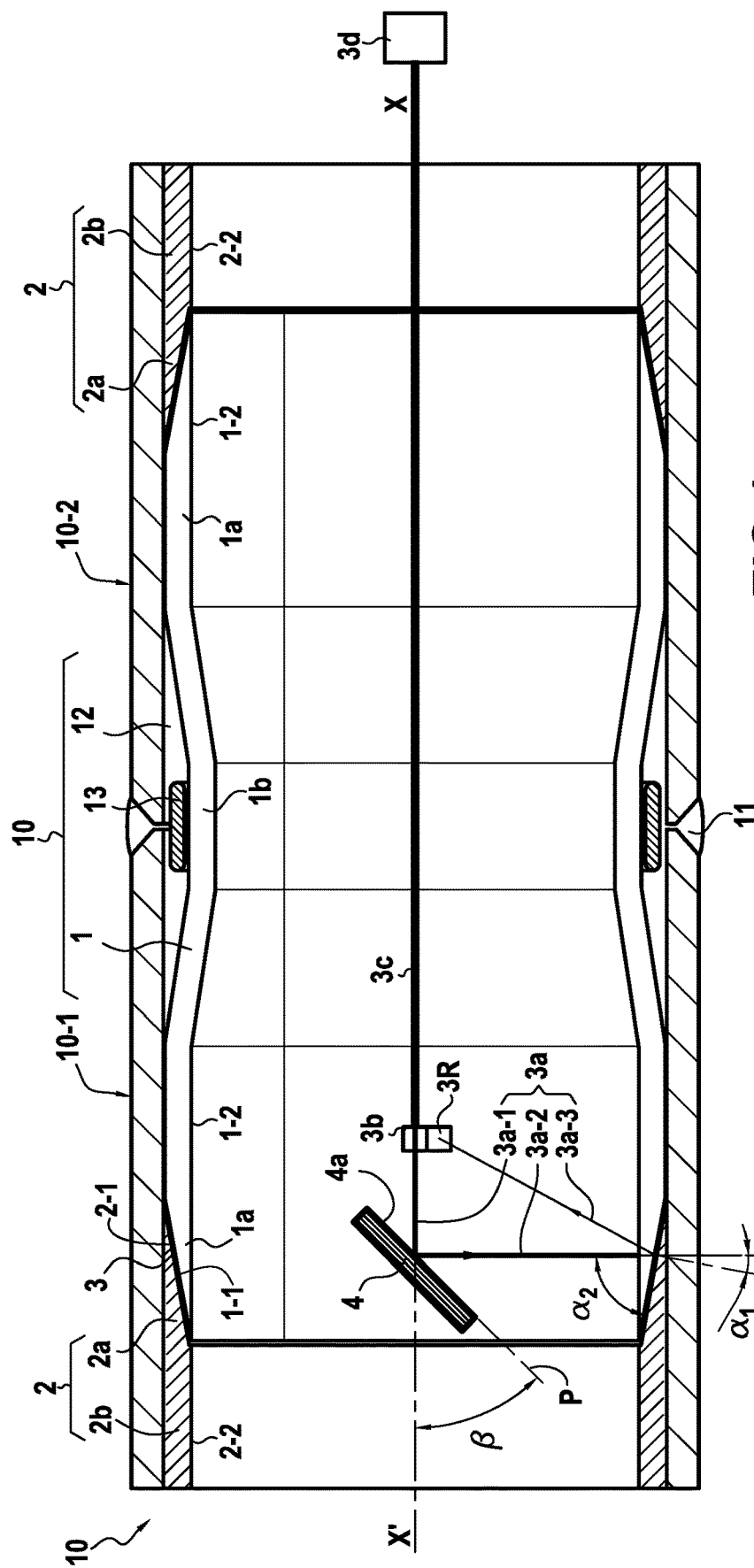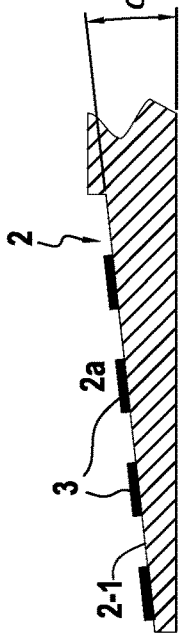

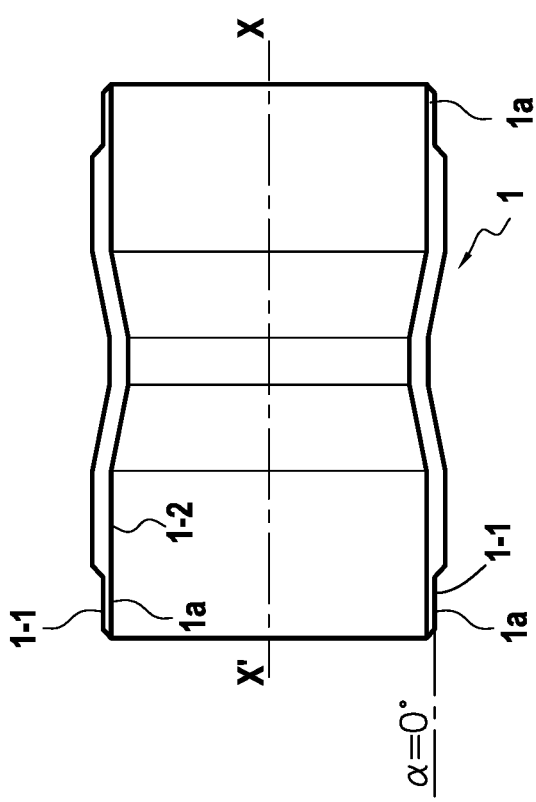
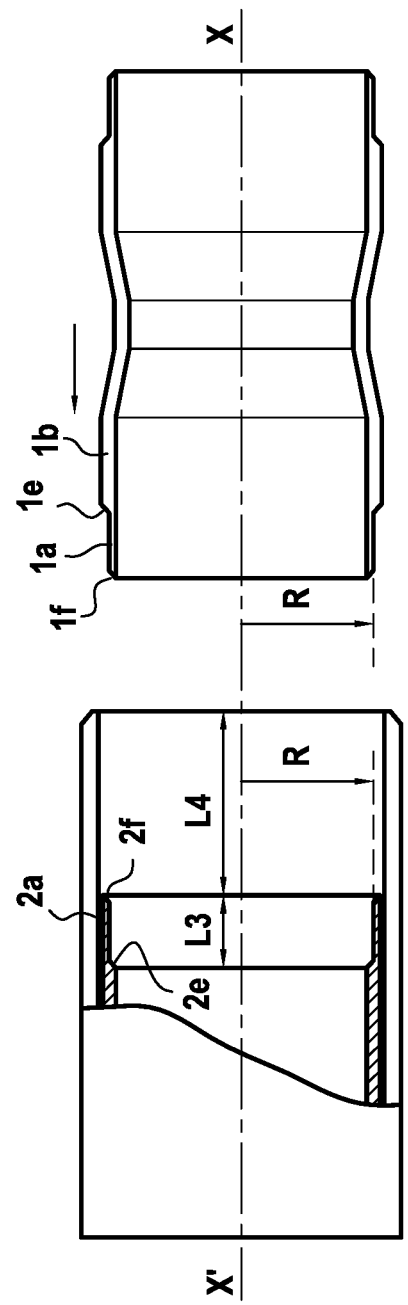

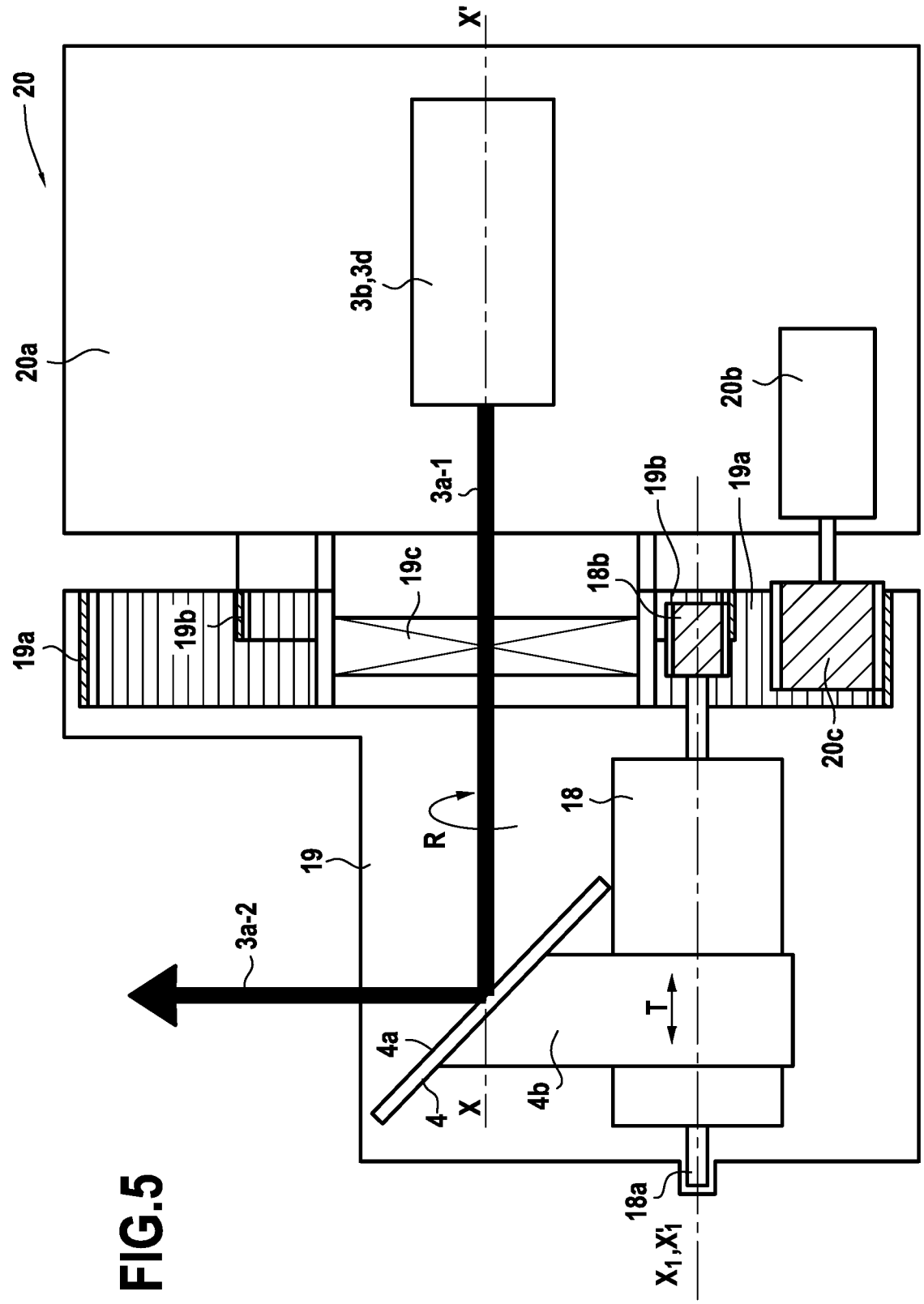

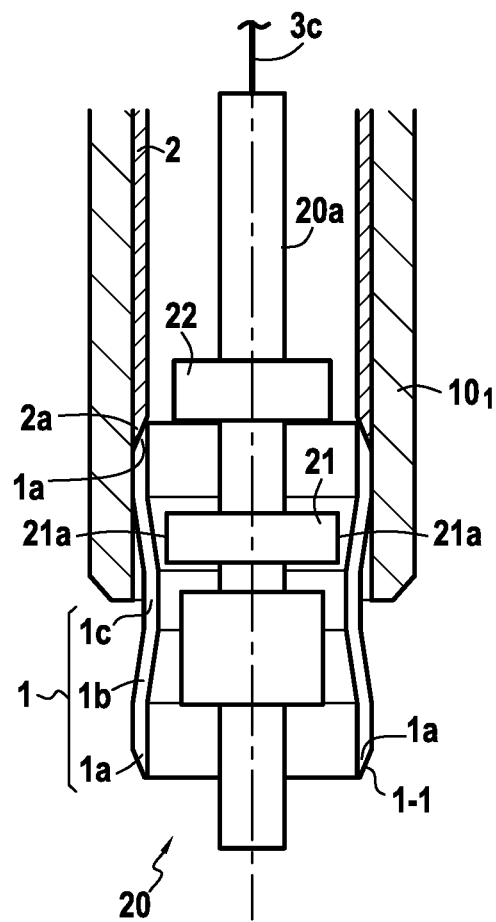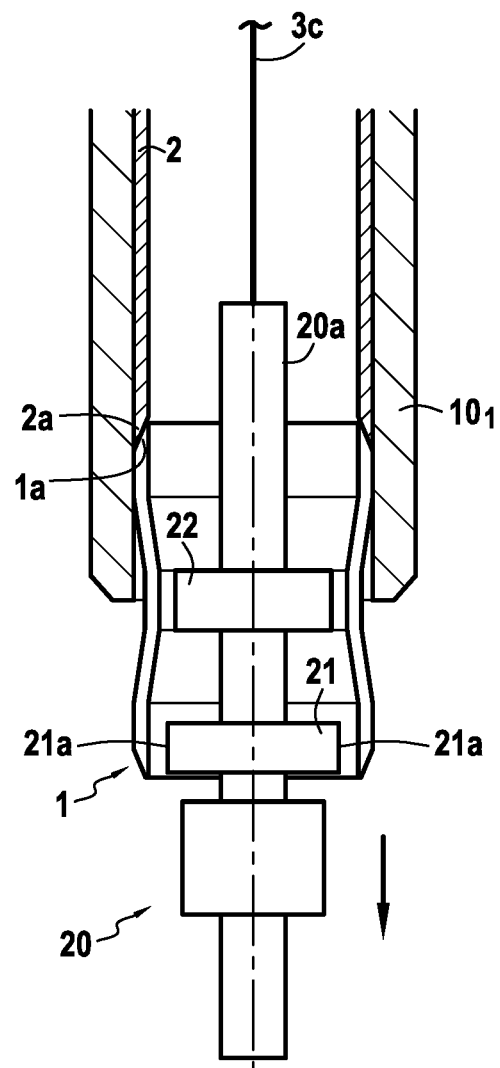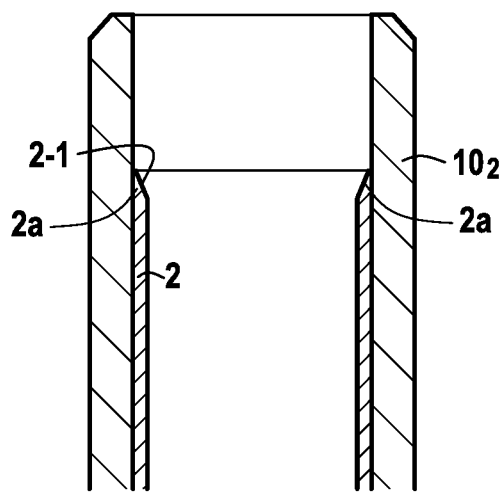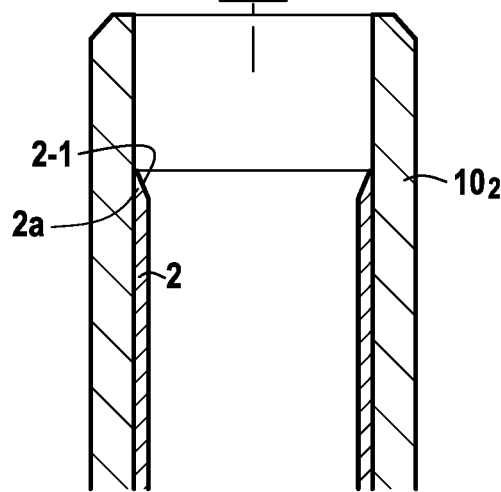
FIG.16  FIG.17

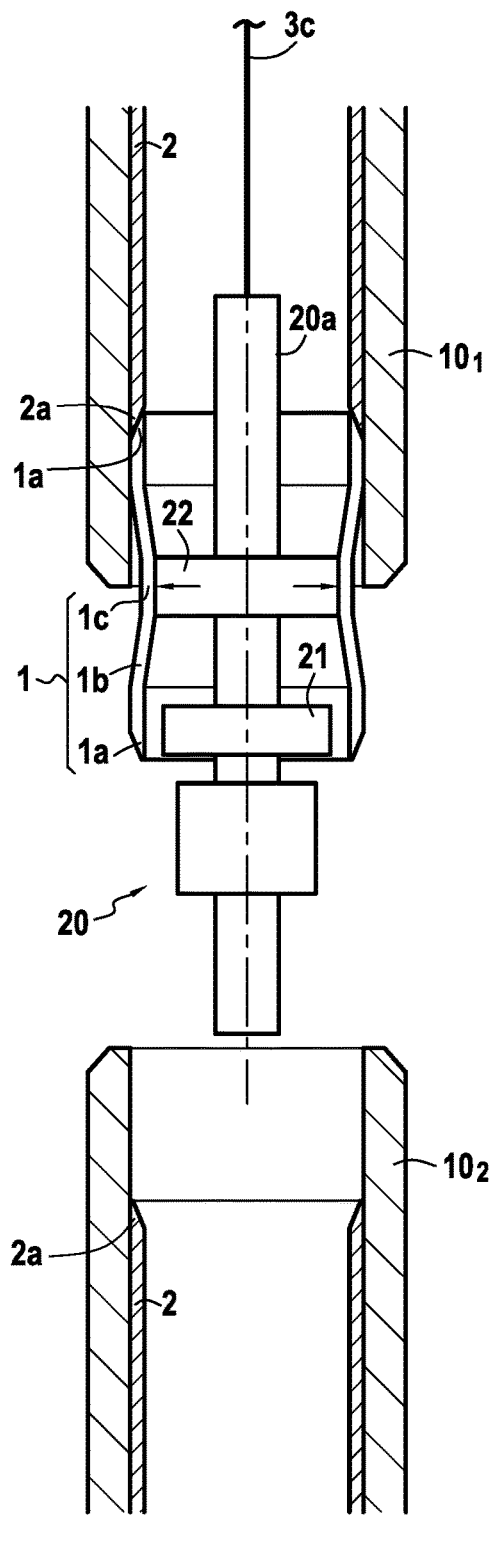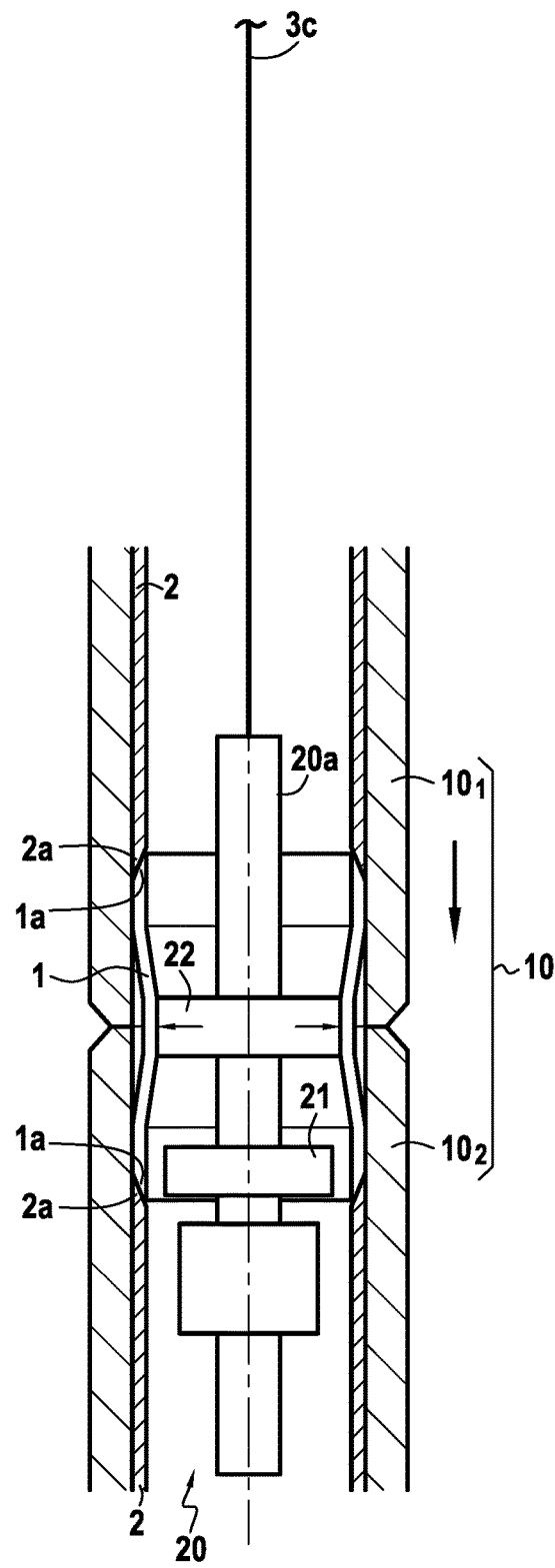
FIG.18  FIG.19

METHOD FOR ASSEMBLING TUBULAR JOINING SLEEVE AND A CONDUIT LINING TUBE BY LASER WELDING

PRIORITY CLAIM

This is a U.S. national stage of application No. PCT/FR2016/052392, filed on Sep. 21, 2016. Priority is claimed on French Application No. FR 1558960, filed on Sep. 23, 2015, the content of which is incorporated here by reference.

BACKGROUND OF THE INVENTION

1. Field of the Invention

The present invention relates to a method of using laser welding to assemble together tubes made of thermoplastic materials. More particularly, the present invention applies to assembling together at least two tubes arranged end-to-end or overlapping coaxially at least in part.

Still more particularly, the present invention relates to assembling together: a) a tubular junction sleeve inserted inside a pipe, in particular an undersea pipe, at a junction between two steel pipe elements that are, or that are to be, metal butt-welded together; and b) an internal liner tube applied as internal covering for said pipe elements.

More particularly, the present invention relates to a device that is for use in an assembly method of the invention and to a method of putting a tubular junction sleeve made of plastics material into place for assembling the pipe from said unit pipe elements and making use of laser welding, said sleeve being applied and secured to said liner by laser welding at the junction between the abutting ends of the two unit pipe elements.

The present invention relates more particularly to assembling together pipes conveying fluids that are corrosive, in particular undersea pipes conveying † Translation of the title as established ex officio.

seawater under pressure that is to be injected into wells in an oil field, and still more particularly connection pipes resting on the sea bottom or bottom-to-surface connection pipes.

The present invention relates still more particularly to connecting together unit pipe elements having internal liners, and still more particularly elements that are 24 meters (m) or 48 m long, and that are installed on deepwater oil fields, e.g. at depths of 2000 m to 3000 m, or even more, from a pipe-laying ship fitted with J-lay towers.

2. Discussion of the Background Art

In known manner, the ends of said pipe elements are assembled end-to-end by welding, and the internal liners inside said pipe elements terminate at a significant distance, e.g. 100 millimeters (mm) to 300 mm from the ends of said pipe elements so that the heating of the steel wall while the ends are being welded together does not damage said lining. A problem that then arises is to provide corrosion protection for the non-lined zone extending between the end of the liner of pipe element N and the end of the liner of the following pipe element N+1.

It is known to use laser welding to weld together two plastics components in the form of films, plates, or injected parts. In order to weld two plastics components together by laser welding, it suffices for the first component, through which the laser radiation passes, to be transparent or translucent at the wavelength in question, and for the second component to be absorbent. This guarantees localized concentration of heat at the point where the laser ray or beam is incident against the absorbent portion, which heat is transmitted by conduction to the transparent portion in contact therewith via a join plane between the two plastics components that are respectively transparent and absorbent.

Methods of assembling parts by laser welding are adapted to assembling tubes by assembling their ends together end-to-end. JP 2011/240669 relates to welding together two portions of a tank. Two of the ends of two tubular portions made of plastics material and arranged end-to-end are laser welded via their frontal surfaces. The pressure exerted on the contacting surfaces for welding together is directed axially (and not radially) and emphasis is directed to the mechanical device for end-to-end clamping, which device has clamping elements 40 for holding the two tubular portions that are to be butt-welded in stationary manner one against the other, said clamping elements 40 being positioned on the outside at the peripheries of the two tubular portions for welding together. Finally, there is no provision for moving in axial translation the mirror that reflects the laser beam that is emitted in the axial direction of the two tubular portions from outside the two tubular portions, nor is there any provision for varying the angle of inclination of said mirror relative to the axial direction.

Document FR 2 382 970 likewise describes assembling tubular parts together end-to-end by laser welding together their end frontal surfaces that extend at 90° relative to the axial direction. Once more, a complex mechanical clamping device, which has pistons 18 acting on wedges 26, needs to be used in order to apply the pressure required for keeping the two tubular portions that are to be welding together pressed one against the other. As a result of the arrangement of that mechanical system, the orientation of the laser beam is necessarily at 90° relative to the axial direction and it is not possible either to vary the angle of inclination of the mirror 42 relative to the axial direction or to move it in translation in the axial direction in order to move the incident laser beam.

EP 0 722 824 describes an electrofusion tubular junction sleeve having heater coils enabling said sleeve to be welded to the internal liner present in a steel pipe element, said tubular junction sleeve enabling two pipe elements to be assembled together end-to-end while providing the junction between the two liners of the two pipe elements and also allowing the junction between the two pipe elements to be made by welding.

WO 2010/041016 describes a sleeve enabling welding to be performed by electrofusion using a Joule effect heater wire between two pipes fitted with plastics liners. In WO 2012/017171, the Applicant describes a method of assembling together two steel pipe elements that are lined with internal liners by using a tubular junction sleeve that is improved in terms of sealing, in particular in the context of on-site assembly onboard a ship at sea, using pipe elements of short length that are suitable for laying from a ship at sea.

To do this, in WO 2012/017171, the tubular junction sleeve is interposed between two butt-joined steel pipe elements having internal liners of thermoplastic material, the ends of the two pipe elements being welded together. Said tubular junction sleeve made of thermoplastic material, preferably identical to the material of said liners, is inserted inside the pipe at the abutting ends of the two pipe elements so that the terminal portions at the ends of said sleeve are in sealed contact, at least in part, with the respective terminal portions at the ends of said internal liners of the two pipe elements. Said tubular junction sleeve presents respective Joule effect heater wires at each of said terminal portions of the sleeve in said zones of sealed contact with the terminal portions of said liners, which wires are preferably arranged in a spiral on the outer surface of each of said terminal portions at the ends of said sleeve. Said sealed contact zones are zones of fusion welding between the materials constituting each said terminal portion of the sleeve and each said terminal portion of said liner in contact with each other and having said heater wire running therealong.

Such sealing of the contact between the sleeve and the liner is important in order to avoid any contact between seawater and the facing weld zone of said tubular sleeve. When the pipe is a water injection pipe, in the event of water penetrating between the sleeve and the pipe, such direct contact could lead specifically to electrochemical corrosion phenomena of the steel pipe and of the weld, insofar as said mechanical connection between the sleeve and the liner is not necessarily sealed.

Said fusion zone is obtained by electrically powering said Joule effect heater wire so as to heat said zone at the interface between said contacting surfaces of the terminal portions of the sleeve and of the liners. In said fusion welding zone (referred to below for short as the "fusion zone"), fusion is thus obtained in that disclosure by the known, so-called "electrofusion" method, which makes it possible to provide a relatively extensive sealed contact zone in the zone along which the heater wire passes and around that zone.

The electrofusion welding method requires a minimum thickness of 8 mm for the terminal portions of the sleeve and of the liners that are to be welded together in order to be able to pass the electric wires and in order to achieve good effectiveness. In particular, because the sleeve needs to have the heater wire pass therethrough so as to reach its outer surface, the heater wire leads to the sleeve melting over its entire thickness if the sleeve is not sufficiently thick.

Concerning its anti-corrosion properties, an internal liner would be functional having a thickness of only 1 mm to 5 mm. Nevertheless, given the constraints acting on the internal liner while it is being put into place, where a thermoplastic liner tube is inserted by traction and striction through a die inside a steel unit pipe element having a length of about 50 m, it is not possible to go below a thickness of preferably 3 mm, since the tube might then be pressed poorly against the steel pipe. The ideal thickness for a liner is thus 3 mm to 5 mm.

SUMMARY OF THE INVENTION

An object of the present invention is to avoid electrofusion welding coils that tend to create defects in the weld zone, which can potentially weaken it, and that imply having fusion zones that are relatively extensive and that therefore require relatively long cooling times.

In general manner, an object of the present invention is to provide fusion welding of plastics materials at the assembly between two abutting or overlapping thermoplastic tubular elements, in a manner that is more accurate, more reliable, and can be performed more quickly.

Another object is to provide fusion welding of thermoplastic materials for assembling together two tubular elements that eliminates any risk of leaks that might run along the heater wire, which would give rise to a weld that is not sealed, as is discussed in WO 2012/017171.

Another object is to provide a weld between a junction sleeve and an internal pipe liner that makes it possible to use an internal liner of small thickness, and in particular of thickness less than 5 mm.

To do this, the present invention provides a method of assembling together tubes made of thermoplastic material, in which at least two tubes are assembled together, the method being characterized in that said assembly is performed by laser welding two contact surfaces of revolution pressed one against the other belonging respectively to two portions of two tubes, preferably end portions, and comprising at least:

a terminal portion of a first tube that is transparent to the wavelength of the laser; and a terminal portion of the second tube, that is absorbent to the wavelength of the laser; and said welding being performed by using a laser beam that is moved in rotation (R) through 360° relative to the common longitudinal axis XX' of the first and second tubes, a laser device, or a head of the laser device, emitting said laser beam being arranged inside one of said first and second tubes in such a manner that said laser beam passes firstly through said transparent terminal portion of the first tube in order to reach a zone of said contact surface of revolution of the absorbent terminal portion of the second tube, and said contact surfaces are preferably pressed one against the other in order to make a weld zone by fusion between said contact surfaces of revolution of the transparent portion of the first tube and of the absorbent terminal portion of the second tube;

the method being characterized in that said first tube is a tubular junction sleeve of thermoplastic material inserted inside a pipe comprising at least two steel pipe elements, each of the two pipe elements including an internal liner tube of plastics material, each constituting a said second tube, said tubular junction sleeve being inserted at the level of the end-to-end assembly between the non-lined ends of the two pipe elements that are, or that are to be, metal welded together, said terminal portions of the sleeve and of the liners being in contact with one another at outer surfaces of revolution of said terminal portions of the sleeve in contact with inner surfaces of revolution of said liners, said surfaces of revolution of said terminal portions of the sleeve and of the liners presenting the same axis of revolution as said pipe and overlapping in the axial direction, and said welding is performed preferably while applying a said pressure to the inner surface of said sleeve in the radial direction at said contacting surfaces of revolution.

It can be understood that said weld zone is located at the point of contact between said contact surface of the transparent portion of the first tube and the point of contact of the laser beam on said contact surface of revolution of the absorbent portion of the second tube. More particularly, the width of the weld zone corresponds substantially to the width of the laser beam, generally about 1 mm to 5 mm, and is concentrated on the interface between the two contact surfaces to be welded together by the reflection of the beam on the absorbent portion.

It can thus be understood that said weld zone extends over the entire periphery of said contact surfaces of revolution when the laser beam is moved in rotation (R) through 360° relative to the common axis XX' of the tubes.

The laser welding is the result of the materials constituting the two contact surfaces melting together, said weld being localized at the zone of the points of contact of the laser beam on the contact surfaces. Said weld zone forms a sealed contact zone between said contact surface of the transparent portion of the first tube and said contact surface of revolution of the absorbent portion of the second tube.

The term "laser beam" is used herein to designate a unidirectional laser beam, and the term "transparent to the laser radiation" is used to mean that said material allows more than 20%, and preferably more than 50% of the light to pass through.

The laser welding of the present invention is advantageous in that it makes it possible to obtain a weld zone that is cleaner and more precise, in particular that is better localized and above all without weld beads or rims possibly requiring machining.

Thus, with laser welding technology, it becomes easier to provide a tubular junction sleeve for welding that is of any shape, in particular with a clear cut perpendicular to the axis of the liner with which it is to be assembled, where appropriate, and/or for liners of small thickness, in particular of thickness less than 5 mm, as explained below.

The laser welding of the present invention thus confers improved welding quality without any risk of leakage and with a reduced risk of weld failure, and as a result of the weld zone being very accurately localized, the time required for cooling is also short compared with electrofusion using a coil and a heater wire, since the heat at the point of fusion is localized to the size of the beam.

The implementation with a laser welding zone is advantageous in that it makes it possible to ensure sealing that is more complete and more reliable at the contact surface between said terminal portions of the sleeve and of the liner, so as to avoid any risk of the metal weld coming into contact with water in the pipes when said pipe is used to convey water, and thus avoid any risk of the zone situated between the outer surface of the sleeve and the inner surfaces of said pipe elements being invaded, which would inevitably lead to shrinking of the inside diameter of the sleeve, i.e. of the fluid flow section, and thus to disturbances in the flow of fluid inside the sleeve, not to mention the risk of said weld coming into contact with water when said pipe conveys water.

Finally, the laser welding of the present invention makes it possible to weld inside a tube at considerable distances, in particular longer than 1000 m, by using an umbilical that is relatively light in weight, containing power supply circuits and bundles of optical fibers for transmitting the laser beam.

Another advantage of the present invention compared with electrofusion welding is to eliminate the constraint of using heater wires and of positioning electrical connectors for the heater wires in one of the tubes, in particular in a said tubular junction sleeve.

Another advantage of the present invention is that the energy required for the laser is relatively smaller, e.g. of the order of 50 watts (W) to 100 W, since laser welding can be performed validly in practice over a thickness of 1 mm to 2 mm, both for the transparent portion and for the absorbent portion. The weld penetrates less deeply into the absorbent portion when it is more absorbent and thus more filled with opacifying agent, and in particular with carbon black.

Another advantage of such assembly by laser welding is that it makes it easier to inspect the quality of the welding by analyzing the absorption of the welded zone. To do this, it suffices to send a second laser beam for inspection purposes under the same conditions and with the same device onto the weld zone and to analyze the power absorbed by analysis using photocells that are sensitive to the second beam as returned by reflection on the non-welded zones, as explained below.

All of these advantages of the laser welding of the present invention make it possible to maximize reliability and also to optimize working time when making the weld and when using it for assembling together tubes in accordance with the present invention.

Such an implementation is also advantageous in that it makes it possible to use a liner of small thickness than is possible with electrofusion welding.

For laser welding, unlike electrofusion welding, a smaller thickness leads to greater effectiveness of the welding since absorption is less.

The thickness required of the inner liner is mainly a consequence of the length of the pipe in which it is applied by plastic stretching, given the risk of tearing it or of stretching it irreversibly while it is being put into place.

Preferably, said inner liner and said tubular junction sleeve present thickness that is less than or equal to 5 mm, preferably in the range 3 mm to 5 mm.

Such an implementation with inner liners of small thickness, less than 5 mm, is possible for pipe lengths over unit pipe elements or strings shorter than 100 m, or shorter than 50 m for thicknesses up to 3 mm.

Such an implementation has two advantages:

a) Firstly, in this implementation, the liner is easier to put into place since:
   because of the small thickness of the liner, the traction required on the liner tube in order to stretch it during laying is reduced; and
   because of the small thickness of the sleeve, said cylindrical contact surfaces of said inner liner and of said sleeve for welding together overlap and can be superposed without requiring machining of the inner liner, which is thus of constant thickness, and thus without forming a said contact surface of thickness that is reduced compared with the thickness of the main portion of said liner; and b) Secondly, when the terminal portions of the sleeve and of the liner are superposed, head losses can be reduced because of the small thickness of the sleeve, with the difference in inside diameter between the inner surface of said liner and the inner surface of said sleeve being small enough to no longer disturb the flow of fluid in the pipe. Thus, with inner liners of small thickness, head losses are reduced overall in spite of the effect of head losses increasing as a result of the reduction in the inside diameter of the pipe.

Said weld and sealed contact zone extends over the entire periphery of the outer surfaces of revolution of said terminal portions of the sleeve and of said inner surfaces of revolution of said terminal portions of the liners in contact with one another, i.e. over 360° around their axis of revolution XX'. In contrast, said sealed contact zone can extend over merely a portion of the lengths in the axial direction of said surfaces of revolution of the terminal portions of the sleeve and of the liners that are in contact with one another.

It can be understood that said surfaces of revolution of said terminal portions of the sleeve and of the liners present the same axis of revolution as said pipe and as said sleeve in position inside said pipe.

In known manner, each said pipe element comprises an internal liner of plastics material, preferably of thermoplastic material, terminating at a certain distance L from the end of said pipe element, and preferably at least a portion of the outer surface of each terminal portion at the ends of the inner liner may be held in place by adhesive against the corresponding inner surface of the steel wall of the pipe, using an adhesive that is preferably of the epoxy or polyurethane type.

Also known manner, the tubular junction sleeve extends in an axial longitudinal direction XX' of the pipe over a length covering at least the lengths of pipe that are not covered by said liners, i.e. over at least twice said distance L.

It can be understood that:
the outer surface of the main portion of the sleeve adjacent to said terminal portion of the sleeve is situated facing portions of the inner walls of the ends of said assembled-together pipe elements that are not covered by said liners; and
the terminal portions at the ends of the sleeve present surfaces of shapes that are identical or complementary to the surfaces of the terminal portions at the ends of said liners with which they are in contact.

More particularly, said laser beam is perpendicular to said contact surfaces, or is inclined ($\alpha_1$), preferably over a range of 0 to 60°, relative to the perpendicular to said contact surfaces.

Still more particularly, said laser beam is inclined relative to the perpendicular to the contact surfaces for welding together at an angle lying in the range 30° to 60°, and in particular at 45°.

More particularly, said overlapping contact surfaces of revolution of said first and second tubes for welding together are cylindrical or frustoconical in shape about the same axis as the longitudinal axis XX' of said tubes.

In a variant implementation, preferably for sleeves and liners of thickness greater than 5 mm, in particular in the range 5 mm to 10 mm, said sleeve and liners are characterized in that:
said internal liner presents at at least one end a terminal portion of thickness that is reduced compared with the thickness of the main portion of said liner, defining a concave shape with an inner surface forming a said contact surface of revolution, which is preferably frustoconical or cylindrical, of inside diameter that is greater than the diameter of the inner surface of the main portion of said liner;
said sleeve presents at at least one end a terminal portion of thickness that is reduced relative to the thickness of the adjacent main portion of said sleeve, said terminal portion of the sleeve defining a convex shape suitable for overlapping and abutting against the concave terminal portion of reduced thickness of said liner with which it is in contact, said terminal portion of the sleeve defining an outer surface corresponding to a said contact surface of revolution, that is preferably frustoconical or cylindrical, of outside diameter that is less than the diameter of the adjacent main portion of the sleeve and a cylindrical inner surface of substantially the same inside diameter as the diameter of the main portion of the liner and the main portion of the sleeve; and laser welding is performed between said inner surface of revolution constituting a said contact surface of said liner and said outer surface of revolution constituting a said contact surface of said sleeve.

It can be understood that by their complementary shapes, said terminal portion of the sleeve and terminal portion of reduced thickness of the liner enable the sleeve to be inserted against the inner surface of the terminal portion of reduced thickness of the liner merely by forced engagement of said sleeve in the axial longitudinal direction XX' inside said pipe element, and the outer surface of said terminal portion of reduced thickness of the sleeve in contact with the inner surface of the terminal portion of reduced thickness of the liner present shapes that are identical and that are arranged relative to each other so as to bring their identical contours closely together.

Preferably, said inner surface of reduced thickness of the terminal portion of the liner and said outer surface of reduced thickness of the terminal portion of the sleeve that are in contact one against the other have the same frustoconical shape about the same axis XX' as said sleeve and said pipe.

It can be understood that by their respective complementary concave and convex shapes, said frustoconical inner and outer surfaces present an angle at the apex having substantially the same value. In this implementation with a frustoconical contact surface, said contacting terminal portions of reduced thickness of the sleeve and of the liner are of thickness that increases from the ends respectively of the sleeve and of the liner towards the adjacent main portions respectively of the sleeve and of the liner, and the spiral of said weld zone (described below) progresses with turns of increasing diameter from its said first end situated beside the terminal portion of the sleeve of smallest thickness towards its said second end situated beside the terminal portion of the sleeve of greatest thickness.

In a variant, said inner surface of reduced thickness of the terminal portion of the liner and said outer surface of reduced thickness of the terminal portion of the sleeve that are in contact with each other have the same cylindrical shape about the same axis XX' as said sleeve and said pipe, and preferably the end of reduced thickness of the terminal portion of the sleeve comes into abutment against a shoulder defining the inner surfaces of said main portion and said terminal portion of reduced thickness of the liner.

In this implementation with cylindrical contact surfaces, said contacting terminal portions of reduced thickness of the sleeve and of the liner present thicknesses that are preferably identical and substantially constant; and where appropriate, the spiral of said weld zone progresses with turns of constant diameter from its said first end situated beside the terminal portion of smallest thickness of the sleeve towards its said second end situated beside the terminal portion of greatest thickness of the sleeve.

When the inner surface of the terminal portion of reduced thickness of the sleeve is conical or cylindrical, the spiral formed by said weld zone is three-dimensional, i.e. of spiral or a helical shape since its turns are spaced apart in the longitudinal direction of the sleeve.

In the various embodiments described above with the contact surfaces between the terminal portions of the sleeve and the liner being conical or cylindrical, the contact surfaces present cone type topology with a half angle at the apex $\alpha'$ lying in the range 0° to 90° for conical surfaces, and of the type comprising a virtual cone having a half angle at the apex of $\alpha=0°$ for cylindrical surfaces, such that under all circumstances said first spiral end is situated beside the apex of the cone or the virtual cone.

In another implementation, in particular when the internal liner and said sleeve are of small thickness, in particular less than 5 mm, use is made of the following:
a said internal liner presenting at at least one end a terminal portion having the same thickness as the thickness of the main portion of said liner, defining a cylindrical inner surface corresponding to a said contact surface having the same inside diameter as the diameter of the inner surface of the main portion of said liner; and said sleeve presents at at least one end a terminal portion of the same thickness as the thickness of the adjacent main portion of said sleeve, said terminal portion of the sleeve defining:
- a cylindrical outer surface corresponding to a said contact surface of revolution, of outside diameter substantially identical to the diameter of the inner surface of said liner; and
- a cylindrical inner surface of inside diameter less than the diameter of the inner surface of said liner;

said terminal portion of the sleeve thus being suitable for overlapping in superposed manner the terminal portion of said liner with which it is in contact; and said cylindrical inner surface constituting a said contact surface of said liner is laser welded to said cylindrical outer surface constituting a said contact surface of said sleeve.

More particularly, a continuous weld zone is made that is of spiral or helical shape or that comprises a plurality of parallel circular weld zones that are concentric or arranged side by side along the axial direction of said contact surfaces.

The width of the weld zone made in this way by laser welding corresponds to the width of the laser beam, i.e. in practice 1 mm to 5 mm, preferably 2 mm to 4 mm.

In an implementation, the circles are spaced apart by a translation step of size 1 mm to 10 mm, preferably 3 mm to 5 mm, or a helical or spirally shaped weld zone is formed with the helix having a pitch of the same value in the range 1 mm to 10 mm, preferably in the range 3 mm to 5 mm. This produces a weld zone that does not cover the entire area of said contact surfaces over which the movement in the translation direction is performed.

In another implementation, a plurality of circular or helical or spiral zones are made in which the circles or the helical or spiral turns of the weld zone are juxtaposed so that they touch one another, by moving the laser head in translation by an amount that is identical to the width of the circular or helical or spiral zone, so as to obtain a weld zone forming a surface of revolution, in particular a frustoconical or cylindrical surface, that covers the entire cylindrical or frustoconical surfaces of said contact surfaces continuously along the direction of movement in translation and all-around the periphery.

Also in practice, the helical or spiral weld zone or the plurality of said circular weld zones extend over a length in the axial longitudinal direction of the contact surfaces that lies in the range 30 mm to 100 mm.

Still more particularly, the laser head is arranged in such a manner as to emit a said laser beam in a longitudinal direction of said tubes to a mirror, preferably the axial direction XX', in such a manner that said laser beam emitted by the laser head is reflected on the surface of the mirror, the surface of the mirror being inclined at an angle β relative to the longitudinal axis XX' of said tubes, preferably an angle β in the range 30° to 60°, preferably equal to 45°, and said inclined mirror is mounted so as to be capable of pivoting (R) through 360° together with said reflected laser beam by the mirror rotating (R) about the longitudinal axis XX' of said tubes.

More particularly, said laser head is arranged at the end(s) of the optical fiber(s) in an umbilical arranged in the longitudinal direction XX' of the tubes and providing the connection between the laser head and a laser device, the laser device preferably being arranged outside said tubes and said umbilical passing along said tubes.

It can be understood that said angle of inclination of the mirror relative to the longitudinal axis corresponds to the mirror tilting relative to an axis that is perpendicular to the longitudinal direction XX' of said tubes.

More particularly, in a first implementation, said mirror is mounted so as to be suitable also for being moved in axial translation (T) along the axis XX', and said mirror is caused to perform said movement in translation in combination with a said movement in rotation (R) of said mirror through 360° relative to a said longitudinal axis XX' of said tubes.

More particularly, said mirror is moved in translation in continuous manner together with said movement in rotation (R) of the mirror through 360° relative to said longitudinal axis XX', and in particular a continuous zone of welding is obtained that is helical or of spiral shape about the same longitudinal axis XX' as said overlapping cylindrical or frustoconical contact surfaces of said tubes, respectively.

Still more particularly, said mirror is moved in translation step-by-step, with said movement in translation and a said movement in rotation (R) of said mirror through 360° relative to its longitudinal axis XX' being performed in succession, said laser welding being performed only during a said movement in rotation (R) of the mirror. It is thus possible in particular to obtain a plurality of circular weld zones forming parallel circles about a common axis that is the same as the longitudinal axis XX' of said overlapping contact surfaces of revolution of said tubes, said circular weld zones being spaced apart stepwise, or being continuously juxtaposed.

In practice, by way of illustration, said mirror is moved in translation continuously at a rate of 1 mm to 5 mm per revolution, preferably 3 mm per revolution, or in translation in steps of size lying in the range 1 mm to 5 mm per step, preferably 3 mm per step. The speeds of movement in rotation and in translation may be decoupled in order to cause energy to be deposited once only, or else in layers that are deposited in succession and close together in time, preferably prior to cooling.

More particularly, in a second implementation, the surface of said mirror is mounted so as to be suitable for being inclined at an angle of inclination β that is variable relative to the longitudinal direction XX' of said tubes, and said angle of inclination β of the surface of the mirror is varied relative to said longitudinal direction XX' in combination with a said rotation (R) of said mirror relative to said longitudinal axis XX'.

This implementation causes the angle of the laser beam reflected by the mirror to vary while forming the incident laser beam that reaches the surface of said absorbent portion that receives said laser beam. And, the variation of the angle of inclination of the surface of the mirror and the resulting variation of the angle of the laser beam produces the same effect as moving the mirror in translation. This angle of inclination may also be varied step by step, i.e. discontinuously or continuously.

In a first variant, said angle of inclination of the mirror is varied continuously, and simultaneously said mirror is caused to move in rotation (R) through 360° relative to the longitudinal axis XX' of said tubes. Thus, in particular, a said weld zone is obtained that is of spiral shape on said frustoconical contact surfaces, or that is helical about the same longitudinal axis XX' of said overlapping cylindrical contact surfaces of the two tubes.

In another variant, said angle of inclination of the mirror is varied by stepwise angular movements, said angle of inclination of the mirror and said movement in rotation (R) of the mirror through 360° relative to its longitudinal axis XX' being performed in succession, with said laser welding being performed only during a said rotation (R) of the mirror relative to its longitudinal axis XX'. It is thus possible in particular to obtain a plurality of parallel circular weld zones side-by-side about the same longitudinal axis XX' as said overlapping contact surfaces of revolution of said tubes, said circular weld zones being spaced apart stepwise, or being continuously juxtaposed.

In practice, by way of illustration, the angle of inclination of said mirror is varied continuously with the angle varying at a rate of 0.1° to 5° per revolution, preferably by 0.5° per revolution, or by varying the angle of inclination in steps with the steps having a size of 0.1° to 5° per step, preferably 0.5° per step.

In a variant implementation, preferably for liners having a thickness of at least 10 mm, said internal liner tube is obtained by end-to-end assembly by laser welding of alternating short lengths of transparent first tubes of liner and long lengths of absorbent second tubes of liner, by sending a laser beam against the annular plane frontal end surfaces of said first and second liner tubes in end-to-end contact from a laser head inside at least one of said tubes, the laser beam being inclined relative to the common longitudinal axis XX' of said tubes, said annular plane frontal end surfaces being perpendicular to the axis XX' of the first and second liner tubes, and the short lengths of the transparent first tubes of liner are preferably covered in a covering of the color of said absorbent second tubes of liner.

It can be understood that said right frontal ends form annular plane surfaces extending in a direction perpendicular to the longitudinal direction XX' of the tubes and are constituted by the end faces in right cross-section of said ends.

More particularly, said laser beam is inclined relative to the perpendicular to the frontal contact surfaces for welding together at an angle lying in the range 30° to 60°, and in particular at 45°.

Still more particularly, for assembling this liner tube by laser welding, said angle of inclination is varied by angularly moving said mirror step by step following a said rotation (R) of said mirror through 360° relative to the longitudinal axis XX', said laser welding being performed during a said rotation (R) of the mirror through 360° relative to the longitudinal axis XX' of said tubes in order to make a plurality of circular weld zones in the form of concentric circles.

In another implementation, in order to assemble this liner tube, said angle of inclination is varied by continuous angular movement of the mirror simultaneously with said movement in rotation (R) of said mirror through 360° relative to the longitudinal axis XX' of said mirror, in order to form a continuous weld zone of plane spiral shape.

More particularly, in a variant, a continuous movement in translation is performed together with a rotation (R) of the mirror through 360° relative to the longitudinal axis XX' of said tubes, and a helical weld zone is obtained on said cylindrical contact surfaces with turns of increasing diameters on said frustoconical contact surfaces.

Still more particularly, in another variant implementation, a said movement in translation is performed in steps or a said variation in angle of inclination of said mirror relative to said longitudinal axis XX' of said tubes is performed in steps, said angle of inclination being varied after a said rotation (R) of said mirror through 360° relative to the longitudinal axis XX' of said tubes while making a said laser weld throughout a said rotation so as to make a plurality of circular zones that are side by side and of the same diameter on said cylindrical contact surfaces or of increasing diameters on said frustoconical contact surfaces.

More particularly, the transparent and absorbent thermoplastic materials of said tubes for assembling together by laser welding are PE, PP, or PVDF and PEEK, for example.

These materials are obtained in translucent form or they are made translucent with clarifying agents or nucleating agents, or they can be made opaque and absorbent to visible laser beams using opacifying agents, preferably mineral fillers, and in particular carbon black. Where appropriate, the content of filler, in particular of carbon black, may be adapted depending on the shapes of said portions for welding together, and in particular on the thicknesses of said portions for welding together.

More particularly, said emitted laser beam is a laser beam of a color in the visible spectrum, preferably green or red.

Still more particularly, said laser welding is performed by sending a beam having energy in the range 1 watt per square millimeter ($W/mm^2$) to 5 $W/mm^2$, preferably in the range 2 $W/mm^2$ to 3 $W/mm^2$.

Still more particularly, said movements in rotation (R) of the mirror through 360° relative to the longitudinal axis XX' of said tubes are performed at a rate lying in the range 0 to 100 hertz (Hz), preferably in the range 0.1 Hz to 10 Hz, i.e. 10 revolutions per second to one revolution every 10 seconds.

The quality of the welding depends essentially on the energy deposited per unit area. Thus, by way of example, it is possible to make 10 passes at 0.2 $W/mm^2$ or one pass at 2 $W/mm^2$. In practice, a good weld is obtained when depositing energy in the range 1 $W/mm^2$ to 3 $W/mm^2$, depending on the density of the plastics material under consideration.

Optionally, pressure may be applied during welding, depending on the manufacturing quality and tolerance of the liner and of the sleeve.

When the diameter of the sleeve is well calibrated relative to the inside diameter of the liner, with an error of less than 0.25 mm, then without pressure, welding can be performed perfectly well without pressure. Specifically, the transparent portion of the sleeve, which is partially absorbent, stores heat from the laser, and as a result the sleeve expands and presses against the opaque liner, which is unable to expand because of the steel pipe backing it.

In contrast, if the difference in diameter between the outside diameter of the sleeve relative to the inside diameter of the liner is greater than 1 mm between the tubes, then it is necessary to apply pressure for welding to take place on contacting portions.

In a preferred implementation, the quality of the laser weld is inspected by sending an inspection laser beam onto said weld zone, which beam is preferably emitted using the same device and under the same conditions of movement in rotation, translation, or varying angle of inclination as the welding beam, and by using a sensor to analyze, preferably by measuring absorption, an inspection laser beam reflected on the weld zone, said inspection laser beam presenting less energy than said welding laser beam, preferably energy in the range 0.01 $W/mm^2$ to 0.05 $W/mm^2$, and said inspection laser beam preferably being identical in frequency to the welding laser beam, more preferably at a wavelength longer than 950 nanometers (nm) (outside the visible).

The weld inspection laser beam follows the same path as the welding laser beam, and is emitted via the same laser fiber and the same laser head and the same mirror. A receiver comprising photocells and a sensor measuring absorption suitable for analyzing the reflected beam and for determining the absorption ratio serves to display variations in absorption without waiting for the sleeve to be cooled.

By analyzing the reflected laser light by imaging, non-welded zones that can be seen, since welded zones on the opaque liner absorb all of the energy applied thereto and thus remain black, whereas non-welded zones appear white, since reflection takes place on the non-welded face of the sleeve.

It is advantageous to use the same wavelengths for welding and for inspecting the weld so as to obtain results that are equivalent in terms of penetration into the transparent tube (equivalent absorption).

The present invention also provides a device suitable for performing the method of the invention, characterized in that it comprises a mechanical system supporting a mirror and a laser head connected to an umbilical, suitable for adapting to and being moved inside said first and second tubes for assembling together, and comprising:
  forced radial extension means suitable for bearing against the inner surface of one of said first and second tubes for assembling together and creating contact pressure in the zone of said contact surfaces for welding together;
  means suitable for moving said mirror in rotation (R) about the longitudinal axis XX' of said first and second tubes for welding together;
  means for moving said mirror in translation (T) relative to said mechanical system; and/or
  means for varying the angle of inclination (β) of the surface of said mirror relative to the axis XX' of said first and second tubes on a common axis for assembling together and in which said mechanical system is inserted.

Said mechanical system supporting said mirror and said means for radially extending, means for rotating, and/or means for varying the angle of inclination of the mirror, may comprise a carriage that is motor driven or suitable for being moved in said pipe or a mandrel suitable for being moved in said pipe.

More particularly, the device comprises a mandrel supporting a laser head or a laser device and an inclined mirror at an angle of inclination β, said mandrel being suitable for being placed inside one of said first and second tubes and having the same longitudinal axis XX' as said tubes, said laser head and said inclined mirror being arranged axially inside said first and second tubes, and said mandrel supporting at least one transparent peripheral wall that is radially expandable by inflation, thereby forming a first inflatable chamber suitable for applying pressure, preferably at a pressure of 2 bars to 3 bars, against said contact surfaces of said first and second tubes for welding together, said mirror being placed inside said inflatable chamber, said mandrel also supporting an umbilical including at least one compressed air feed circuit for inflating said first inflatable chamber and an electrical power supply circuit for an engine suitable for moving said mirror in rotation R and driving said movement in relative translation T or varying said angle of inclination β.

It can be understood that the device is thus suitable for performing said laser welding by positioning said inflatable chamber facing said contact surfaces of the two tubes for welding together and by inflating said inflatable chamber so that said contact surfaces for welding together can be pressed one against the other, and by causing said mirror to move in rotation (R) through 360° about the longitudinal axis XX' of said tubes and of said mandrel, and by moving the point of incidence of the laser beam on the contact surfaces for welding together in the longitudinal direction XX' by moving said mirror in translation (T) relative to said mandrel or by varying the angle of inclination (β) of said mirror relative to said longitudinal axis XX', said movement in translation or said variation of angle of inclination being suitable for being combined with said movement in rotation (R) relative to the axis XX', in particular in order to make at least one circular weld zone or at least one weld zone that is helical or spiral in shape.

Still more particularly, said mandrel supports a motor suitable for driving the movement in rotation (R) of said mirror through 360° about the longitudinal axis XX' of the mandrel by using a gearing and ball bearing system.

More particularly, said mirror is suitable for being moved in translation or for having its angle of inclination varied relative to the longitudinal axis of said mandrel by a worm-screw mechanism constrained to rotate with said rotation (R) of said mirror about the longitudinal axis XX' of said mandrel, or by a lug for stepwise triggering of said movement in translation or of said angular variation.

Still more particularly, in a first embodiment, said mirror is suitable for being moved in translation relative to the longitudinal axis of said mandrel by a worm screw mechanism constrained to rotate with said movement in rotation (R) of said mirror about the longitudinal axis XX' of said mandrel, in particular to make a weld zone of spiral or helical shape, or by a lug for triggering stepwise movement in translation, in particular in order to make a plurality of parallel circular welds side by side, one for each step.

Still more particularly, in a second embodiment, said mirror is suitable for having its angle of inclination (β) varied relative to the longitudinal axis of said mandrel by a worm screw mechanism constrained to rotate with said movement in rotation (R) of said mirror about the longitudinal axis XX' of said mandrel, in particular to make a weld zone of spiral or helical shape, or by a lug for triggering stepwise variation in the angle of inclination, in particular in order to make a plurality of parallel circular welds side by side, one for each step.

Still more particularly, said mandrel further supports a weld inspection device comprising a sensor suitable for analyzing an inspection laser beam reflected on the weld zone, the analysis preferably being by measuring absorption, said mandrel being connected to an umbilical having optical fibers, and electrical power supply circuits.

Still more particularly, said mandrel also supports a second inflatable chamber having a peripheral wall that can be expanded radially by inflation, the second inflatable chamber being spaced apart from said first inflatable chamber in the longitudinal direction XX' of said mandrel.

The method of putting the sleeve into place and the method of using the sleeve with the device of the present invention are made easier by the fact that said second chamber makes it possible to:
  facilitate guidance of the device of the invention and enable it to be moved longitudinally more easily inside a pipe and/or a sleeve, by inflating said first and second chambers partially to a diameter that is slightly smaller than the diameter of the pipe or of the sleeve, the two chambers being spaced apart in the longitudinal direction in such a manner as to come into abutment against the wall of the pipe and of the sleeve and thus hold the mandrel in the axial direction of the pipe or of the sleeve in spite of the opposing weight representing said welding control device; and
  fastening the device of the invention inside said sleeve by maximally inflating said second inflatable chamber so that it is pressed securely against the inside wall of the sleeve, thereby stabilizing the mandrel relative to said sleeve in order to adjust its position before performing said laser welding, with position adjustment consisting in pre-positioning said first chamber facing said sleeve terminal portion to be welded after the first chamber has been inflated; and stabilizing the device of the invention relative to said sleeve by maximally inflating both of said first and second chambers that are thus pressed securely against the inside wall of the sleeve while performing said laser welding, and subsequently while moving said weld inspection means.

Preferably, said first and second inflatable chambers extend over respective lengths $L1$ and $L2$ and they are spaced apart by a distance d in the longitudinal direction of the mandrel such that when a said first inflatable chamber is radially expanded to press against the terminal portion of the sleeve, in particular when it is arranged against the terminal portion of the internal liner of the pipe in order to perform laser welding, the second inflatable chamber is facing a portion of the tubular internal wall of said sleeve and can be pressed thereagainst.

The present invention thus provides a method of putting a tubular junction sleeve into place at one end of a unit pipe element that is internally lined with thermoplastic material in order to fasten a said sleeve to a terminal portion of lining, said sleeve presenting at each end a terminal portion with a tubular wall, preferably of thickness that is reduced relative to the thickness of the adjacent main portion of the tubular wall of said sleeve, and a weld and sealed contact zone is created by a laser beam heating and melting together the constituent materials of said terminal portion of the sleeve and of the terminal portion of said liner that are in contact with each other, with said laser beam passing therethrough, by using a device of the invention for putting a sleeve into place.

More particularly, the following steps are performed, preferably on the deck of a pipe-laying ship or on land:

i.1) positioning said device for putting a sleeve into place inside said sleeve so that at least one said first inflatable chamber is positioned facing a first terminal portion of the sleeve, the other of said first and second inflatable chambers facing the inside wall of the main portion of the sleeve, and said at least one second inflatable chamber is inflated so as to secure the device for putting the sleeve into place relative to said sleeve by pressing the expandable wall of said second chamber against the inside wall of said tubular sleeve; and i.2) moving the resulting assembly of the sleeve and said device for putting the sleeve into place axially in the longitudinal direction XX' into a sleeveless open end of a pipe element until said first terminal portion of the sleeve is in contact with said terminal portion of the liner of said female end of said pipe element; and i.3) inflating said first inflatable chamber in order to press it against the inside wall of said first terminal portion of the sleeve; and i.4) sending said welding laser beam that is moved in rotation and translation or by varying angle of inclination, preferably while simultaneously exerting pressure from said sleeve terminal portion against said liner terminal portion that are in contact with each other by inflating said first inflatable chamber in order to make a said laser welding zone of the constituent materials of a portion of said terminal portion of the sleeve and a terminal portion of said liner that are in contact with each other, and through which said laser beam passes; and i.5) inspecting the quality of the weld by sending an inspection laser beam that is moved in rotation and translation or by varying angle of inclination, said inspection laser beam being of lower energy than the welding beam, and analyzing the laser beam reflected on the weld zone; and i.6) deflating said first and second chambers and moving said device for putting a sleeve into place in translation, in order to remove it.

It can be understood that said resulting pipe element has a sleeve portion beside the second free terminal portion outside the pipe element corresponding to said male end of step a) of the method of making the pipe as described below.

The present invention also provides a method of making a pipe using a device invention for putting a sleeve into place, by assembling unit pipe elements each including a said liner and a said tubular junction sleeve inserted and fastened in only one end of each said pipe element and projecting therefrom, the projection of said sleeve defining a male end of each said pipe element that is suitable for assembling with a sleeveless end and defining a female end of another said pipe element. Using laser heating to create a weld and sealed contact zone by melting together the constituent materials of a said terminal portion of the sleeve and a terminal portion of said liner that are in contact with each other, and through which said laser beam passes, by performing the following steps:

a) inserting a device for putting a sleeve into place inside a said unitary pipe element in such a manner that said first inflatable chamber is arranged at a terminal portion of said sleeve, and fastening said device for putting a sleeve into place inside said sleeve by inflating a said second inflatable chamber against the inside wall of said sleeve;

b) after or before step a), inserting and forcing the sleeve portion forming said male end of one pipe element into the female end of another pipe element in the axially longitudinal direction XX' until said terminal portion of the sleeve of said male end of said terminal pipe element comes into contact with said terminal portion of the liner of said female end of said pipe element to be assembled therewith;

c) externally peripherally welding together the ends of said two pipe elements in abutment by metal welding;

d) inflating a said first inflatable chamber at said terminal portion of the sleeve that faces it, and sending a said laser beam, preferably while simultaneously exerting pressure from said terminal sleeve portion against said terminal liner portion in contact with each other so as to create a weld zone by melting in a portion of the contact surfaces of each of said mutually contacting sleeve and liner terminal portions through which the laser beam passes, so as to create a said weld and sealed contact zone by melting;

e) inspecting the quality of the weld by analyzing, preferably by measuring absorption, an inspection laser beam reflected on the weld zone; and f) deflating said first and second inflatable chambers and moving said device for putting a sleeve into place in translation.

More particularly, the following steps are performed:

a.1) lowering a first pipe element down a pipe-laying tower of a pipe-laying ship, the first pipe element being fitted with a said sleeve at one of its ends and being lowered to the proximity of the end of the top terminal pipe element of the pipe that is being assembled and that is partially immersed at the bottom of the tower; and a.2) lowering a said device for putting a sleeve into place while said first and second chambers are at least partially deflated, securing it to a said sleeve fastened to one of said first and second pipe elements by inflating a said second chamber that is pressed against the inside wall of the sleeve in its main portion, said first chamber being arranged facing a free terminal portion of said sleeve;

a.3) inflating the first chamber which presses against the terminal portion of said sleeve; and b) after or before step a.3), assembling together the two pipe elements by engaging and forcibly inserting the portion of a sleeve forming said male end of a pipe element into the sleeveless female end of the other pipe element;

c) performing said metal welding between the ends of the two abutting pipe elements; and d) sending a said laser beam, while simultaneously exerting pressure from said sleeve terminal portion against said liner terminal portion that are in contact with each other by inflating said first chamber in order to make a said laser weld zone; and e) deflating the first chamber and sending an inspection laser beam onto the weld zone.

Still more particularly, before step a), the steps i.1) to i.6) of the method of the invention are performed for putting a tubular junction sleeve into place in one end of a unit pipe element, preferably on the deck of the ship or on land, in order to fasten a said sleeve to the terminal portion of a said pipe element prior to assembling it with another said pipe element.

The terms "inner" and "outer" are used herein relative to the inside and the outside respectively of the pipe, of the sleeve, or of the liner, as the case may be.

The term "main portion" of the sleeve is used herein for the central portion of the sleeve situated between the two terminal portions at the two longitudinal ends of the sleeve.

More particularly, the pipe that is to be made is a connection pipe that may either be resting on the sea bottom, or that may be a bottom-to-surface connection pipe suitable for being laid at sea, and said pipe elements have a length lying in the range 20 m to 50 m, an inside diameter lying in the range 10 cm to 60 cm, and said sleeve presents a length lying in the range 45 cm to 150 cm. More particularly, the pipe is a pipe for injecting water under pressure into oilfield wells, which pressure is always greater than 5 MPa and more particularly lies in the range 25 MPa to 70 MPa (250 bars to 700 bars). As mentioned above, this type of pipe is particularly stressed at said metal welds so that they need to be protected as much as possible against any corrosion by contact with seawater, in particular for bottom-to-surface connections, since such a pipe is perpetually moving because of the effects of swell, wind, and current acting on the floating support at the surface, and are therefore subjected to extreme fatigue stresses. Furthermore, the properties of the fluid being conveyed can make it necessary to include large extra thicknesses of sacrificial steel, having a considerable impact on the installation and its pipes. Putting a plastics liner into place serves to eliminate that need.

BRIEF DESCRIPTION OF THE DRAWINGS

Other characteristics and advantages of the present invention appear in the light of the following detailed description given with reference to the following figures.

FIG. 1 is a side view in section of a pipe assembly of the invention using a tubular junction sleeve between two lined pipe elements or unit lengths of pipe of the invention and the liners having terminal portions that are frustoconical.

FIG. 1A is a side view in section of the frustoconical end 2a of the internal liner 2 of a pipe element of FIG. 1, showing diagrammatically the traces of weld zones 3 on said frustoconical contact surface 2-1.

FIG. 2 is a side view in section of the tubular junction sleeve presenting two ends of cylindrical type.

FIG. 2A is a side view in section of a steel pipe 10 having an internal liner 2 machined to form a female cylinder of axis XX' with an inside radius $R_1$, and receiving a tubular sleeve as shown in FIG. 2 that is machined to form a male cylinder of axis XX' and with an outside radius $R_1$ that is substantially identical.

FIG. 5 is a diagram showing an embodiment of said means for rotating R the mirror combined with the means for moving said mirror in relative translation in a device as shown in FIG. 4.

FIGS. 16 to 22 show various steps of assembling together two pipe elements with the sleeve 1 at one end of a first pipe element being put into place and welded to the sleeveless end of a second pipe element by using a device of the present invention, as shown diagrammatically.

DETAILED DESCRIPTION OF THE PRESENTLY PREFERRED EMBODIMENTS

Figure 3:
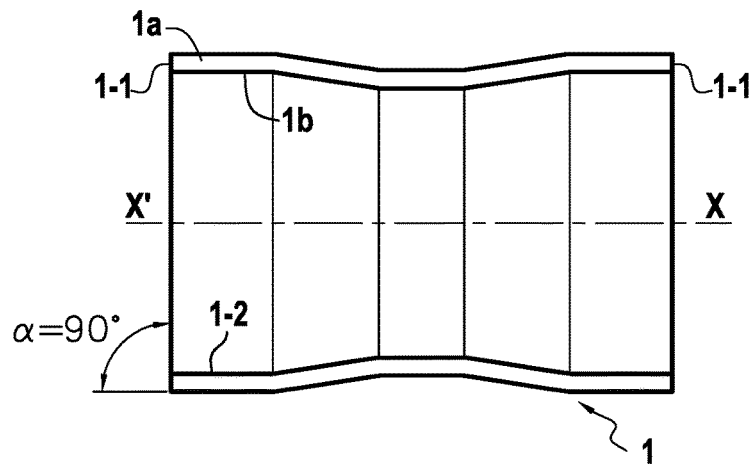
FIG. 3 is a side view in section of a tubular junction sleeve presenting two front ends at right angles of the plane annular type.

FIG. 1A shows a pipe 10 of the invention having at least two pipe elements $10_1$, $10_2$ with internal liners 2 made of polyethylene or polypropylene, which elements are assembled together end-to-end, and the ends of two pipe elements are welded together at 11. Each pipe element has an internal liner 2 made of thermoplastic material having an axis XX' coinciding substantially with the axis of the pipe elements $10_1$, $10_2$, and presenting at each end a conical terminal portion 2a having a half-angle at the apex α lying in the range 5° to 15°, and in particular about 10°, and of thickness that is smaller than the thickness of the main portion 2b of said liner, defining a concave shape with a frustoconical inner surface of revolution having a contact surface 2-1 of inside diameter that is greater than the inside diameter of the main portion 2b of said liner and that terminates at a certain distance L from each end of said pipe elements. The outer surface of each said terminal portion 2a of the internal liner is possibly held in place by adhesive 2c between the end of the liner at or near said terminal portion 2a of reduced thickness of the liner and the corresponding inner surface of the steel wall of the pipe, which adhesive is preferably of the polyurethane type or of the two-component epoxy type.

A tubular junction sleeve 1 made of thermoplastic material, preferably identical to the thermoplastic material of the internal liner 2, of axis XX' coinciding substantially with the axis of the pipe elements $10_1$, $10_2$, and of the same outside diameter that is just slightly smaller than the inside diameter of the pipe, is inserted inside each of the abutting ends of the two pipe elements so as to overlap said terminal portions of the two liners, with this being done by means of a device 20 of the invention, as described below with reference to FIGS. 11 to 19.

At each longitudinal end, said sleeve 1 presents a transparent terminal portion 1a of thickness that is smaller than the thickness of the adjacent main portion 1b of said sleeve, said terminal portion 1a of the sleeve defining a convex shape suitable for overlapping the opaque terminal portion of smaller thickness of said liner 2a with which it comes into contact. Said terminal portion 1a of the sleeve defines a frustoconical outer surface 1-1 of outside diameter smaller than the outside diameter of the adjacent main portion 1b of the sleeve and having the same angle at the apex α as the frustoconical inner surface of said concave terminal portion of said liner. The terminal portions of conical shape of the sleeve define a cylindrical inner surface 1-2 having substantially the same inside diameter as the inside diameter of said main portion 2b of the liner and of said main portion 1b of the sleeve.

In FIG. 1, in a central portion 1c, i.e. a portion about halfway along in the axial longitudinal direction XX', the sleeve presents a reduced outside diameter that is smaller than the outside diameter of its main portions 1b adjacent to said central portion 1c so as to leave an annular space 12 for receiving an annular thermal protection part 13 to protect the sleeve while the ends of the pipe elements are being welded together, said main portions 1b of the sleeve present an outside diameter that is substantially identical to the inside diameter of the ends of said assembled-together pipe elements that are not covered by said liners.

The tubular wall of said sleeve presents a thickness that is substantially constant in its central portion 1c and in its adjacent main portions 1b, which thickness is substantially equal to the thickness of the main portion 2b of said internal liners 2, and said central portion 1c of the sleeve is suitable for deforming to adopt an inside diameter that is substantially identical to the inside diameter of the remainder of the sleeve under the effect of the internal pressure of a fluid flowing inside the pipe in operation, which pressure is at least 1 megapascal (MPa), and the thermal protection part 13 is itself likewise deformable under the same internal pressure conditions inside the pipe so as to adopt a smaller thickness, preferably a thickness of less than 5 mm, more preferably of less than 2 mm, said thermal protection part more preferably being constituted by ceramic fibers in a form similar to cotton wool.

It can be understood that:
 because of its substantially constant thickness, the central portion of the sleeve presents a reduction of outside diameter and of inside diameter while it is being laid, the pipe being empty and at atmospheric pressure, and so long as it is subjected to pressures corresponding to pressure values of less than 1 MPa (10 bars); and
 as soon as the internal pressure exceeds 1 MPa (10 bars), the thickness, in particular of about 3 mm to 10 mm, and the stiffness of the plastics material such as polyethylene or polypropylene allow the inside and outside diameters of the central portion to increase as a result of deformation, e.g. when a fluid flows inside the pipe and the sleeve, in particular water under pressure, as applies to water-injection pipes for oil wells at pressures greater than 5 MPa, and in particular at pressures in the range 25 MPa to 70 MPa.

Because the outside pressure $P_0$ is much smaller than the inside pressure Pmax, the inside pressure has the effect of pressing the constricted central portion 1c of the tubular junction sleeve 1 hard against the wall of the steel pipe, with the ceramic fiber screen 13 also being flattened so as to present a residual thickness of no more than 1 mm to 2 mm.

It is possible to use a laser device of the kind fabricated and sold by the supplier Trumpf (France).

FIG. 1A shows diagrammatically a plurality of traces 3 of laser weld zones that may correspond to a plurality of circular weld zones arranged side by side in discontinuous and parallel manner when the mirror 4 is moved step by step in relative translation as described below, or that may correspond to a continuous weld zone of spiral shape in a spiral of increasing diameter.

In FIGS. 2 and 2A, said inner surface of the terminal portion 2a of reduced thickness of the liner and said outer surface of the terminal portion 1a of reduced thickness of the sleeve, which are in contact with each other, present the same cylindrical shape about the same axis XX' as said sleeve and said pipe, the end of the terminal portion of reduced thickness of the sleeve coming into abutment against a shoulder 2e defining the inner surfaces of said main portion 2b and of said terminal portion of reduced thickness 2a of the liner.

In FIG. 2A, the internal liner has been subjected to machining to obtain a cylindrical shape of axis X'X and of radius R over a length $L_3$ and at a distance $L_4$ from the end of said pipe.

In this embodiment having a cylindrical contact surface, said sleeve is inserted against the terminal portion 2a of reduced thickness of the liner until the end 2f of the liner comes into abutment against a shoulder 1e defining said main portion 1b of the sleeve and said terminal portion 1a of smaller thickness of the sleeve, and/or said sleeve is inserted against the terminal portion 2a of reduced thickness of the liner until the end 1f of the sleeve comes into abutment against the shoulder 2e defining the main portion 2b and said terminal portion 2a of reduced thickness of the liner.

As described in WO 2006/042925, the terminal portions of the liner are made at the end of the insertion process involving "swagelining" and possibly also adhesive, the liner then being cut flush with the steel pipe element, after which it is machined by a machine tool installed on the face of the first end of the pipe element.

Figure 3A:
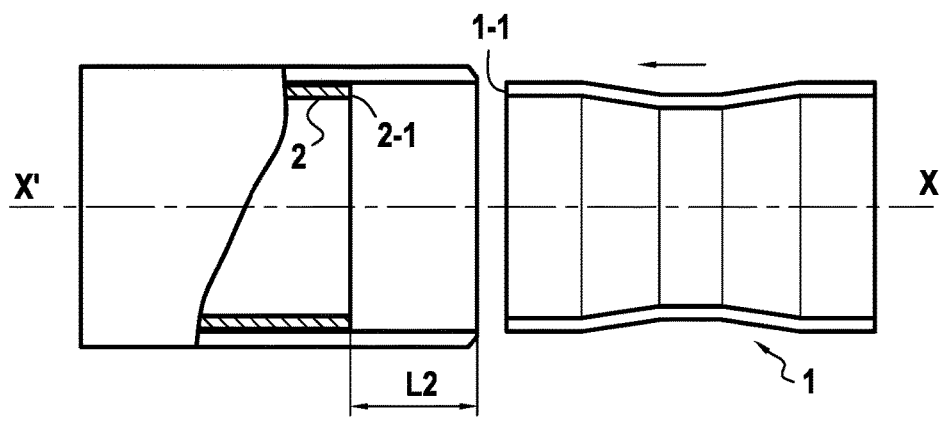
FIG. 3A is a side view in section of a steel pipe fitted with an internal liner machined on a plane perpendicular to the axis XX' at a distance L2 from the end of said pipe, and receiving a tubular sleeve having the configuration of FIG. 3.

FIG. 3A shows machining to obtain a plane face perpendicular to the axis XX' and situated at a distance $L_2$ from the end of said pipe.

The internal liners and the tubular junction sleeves may be assembled together in various ways, each presenting an advantage relative to the thickness of the internal liner 2. The value of the angle α between the axis XX' and the generator line of the surface of the terminal portion 1a of the sleeve in contact with the terminal portion 2a of the liner may lie in the range 0° to 90°. For the embodiments of FIGS. 2 and 3, showing a terminal portion 1a of conical convex shape, the conical outer surface presents a half-angle at the apex α lying in the range 0° to 90°, the apex of the cone being on the left of the figure.

In FIG. 3, there is shown a "frontal" shape: i.e. a shape that is equivalent to the conical shape, but in which the angle α' is 90°.

FIG. 2 shows a cylindrical shape: i.e. a shape equivalent to the conical shape in which the angle at the apex α is 0°, the apex of the notional cone then being located at infinity.

For liners of small thickness, e.g. lying in the range 3 mm to 5 mm, it is advantageous to use the conical embodiment of FIGS. 1 and 1A with an angle α lying in the range 5° to 45°, and preferably being equal to 10°. For medium thicknesses, e.g. in the range 6 mm to 12 mm, it is advantageous to use the cylindrical embodiment of FIG. 2. For large thicknesses, e.g. in the range 12 mm to 20 mm, it is advantageous to use the frontal embodiment with a section at right angles as shown in FIG. 3.

When prefabrication is performed in a workshop, operating conditions are much simpler than on site, and the hourly cost of a pipe-laying ship is not involved. It can thus be appropriate to prepare tubular junction sleeves and pipe strings using assembly technologies that are different from those used on site. For this purpose, FIG. 3A shows a tubular junction sleeve of mixed type, possessing on the right an end of frontal type that is assembled in a workshop to the corresponding frontal end of an internal liner of the string, as shown with reference to FIG. 3A.

FIG. 1 shows only a portion of the means of a device of the invention for assembly by laser welding comprising a laser device 3d arranged outside the tubes 1, 2 and connected by an umbilical 3c to a laser head 3b that is supported by an assembly device 20 (not shown). Said laser head 3b emits a laser beam 3a-1 along the axis XX', which beam is deflected by reflection on the surface 4a of the mirror 4 that is inclined at an angle β of 45° relative to the axial direction XX'. The beam 3a-2 reflects on the surface 4a and reaches the sloping frustoconical contact surfaces 1-1 and 2-1 with said beam being inclined at an angle $\alpha_2$ of 90°−α a relative to said surfaces 1-1 and 2-1 (and by an angle $\alpha_1=\alpha$ relative to the perpendicular to said contact surfaces 1-1 and 2-1).

An inspection laser beam 3a-3 reflected on the weld zone is analyzed by a receiver 3r comprising a sensor suitable for measuring the power that is absorbed so as to verify the quality of the weld when, as explained above, the beam delivered 3a-1, 3a-2 is a weld inspection laser beam of lower energy than the welding laser beam.

FIG. 5 shows a portion of a device 20 of the invention for laser beam assembly, the device comprising a mandrel 20a arranged on the same longitudinal axis XX' as the axis of the tubes 1 and 2 inside which it is inserted, the mandrel 20a supporting an axially arranged laser head 3b emitting a laser beam 3a-1 in the longitudinal direction XX'. The mandrel 20a supports a first inflatable chamber 21 at the front, which chamber is made up of two stationary segments 21-b arranged transversely relative to the longitudinal axis XX' of said first chamber and said tubes, the segments being spaced apart from each other in the direction XX', and being connected together by a transparent flexible sheet 21a made of silicone. Inside the chamber 21 there is a mirror 4 having its reflecting surface 4a inclined at an angle β of about 45° so that the laser beam 3a-1 is deflected through 90° in the transverse direction. The beam 3a-2 reflected on the mirror reaches a point of incidence 3i on the frustoconical contact surface 2-1 of the chamfered end 2a of reduced thickness of the absorbent tube 2, after passing through the end 1a of reduced thickness of the transparent tube 1. The fusion heat of the contact surface 2-1 is transmitted by thermal conduction to the contact surface 1-1 in localized manner at the contact interfaces with the points 3i where the beam 3-2 impacts on the contact surface 2-1.

Figure 4:
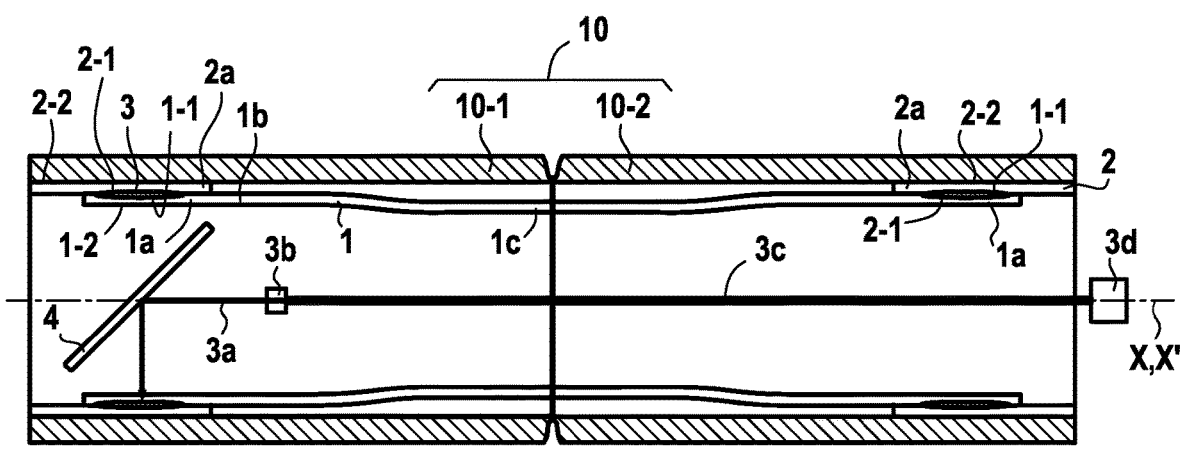
FIG. 4 is a side view in section of a pipe assembly of the invention using a tubular junction sleeve between two lined pipe elements or unit lengths of pipe of the invention, with the sleeve and the liner having cylindrical terminal portions overlapping in superposed manner.

FIG. 4 shows an embodiment in which the internal liner and the sleeve are of small thickness not exceeding 5 mm, with terminal portions that are not machined and that have the same thickness as the adjacent main portions of the liner and of the sleeve respectively. The terminal portions of the internal liner and of the sleeve are superposed without abutting one against another, giving rise to cylindrical contact surfaces 1-1 and 2-1 that are united by a continuous cylindrical weld zone 3.

Figure 6A:
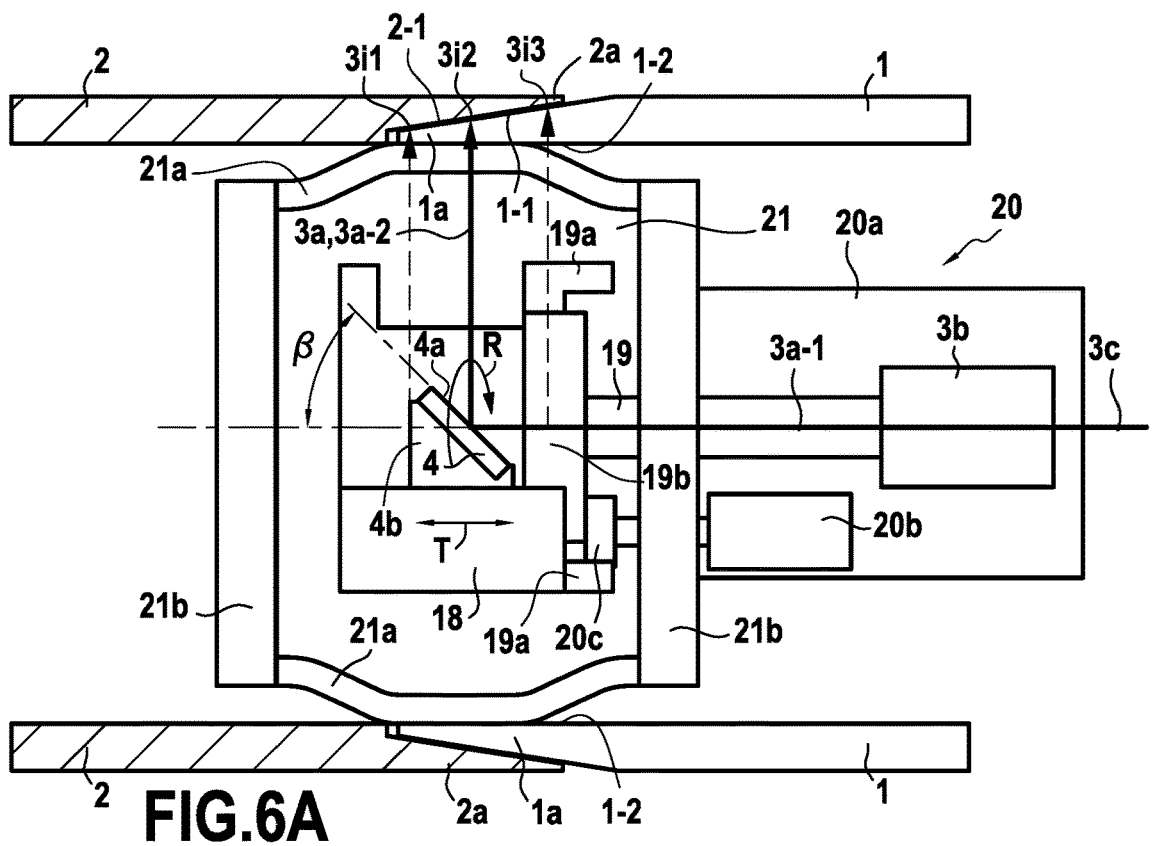
FIG. 6A is a longitudinal section view through the junction between two tubes showing laser welding with a device 20 for performing an assembly method of the invention involving rotating an inclined mirror ($\beta$) about the longitudinal axis XX' of said tubes, in combination with moving said mirror in relative translation along the axial direction XX'.

FIG. 6A is a diagram showing means for moving the mirror in relative translation T inside the stationary chamber 21. The chamber 21 is held in place by inflation and applying pressure against the cylindrical inner surface 1-2 of the tube 1 at the end portion 1a of reduced thickness. Moving the mirror in translation T makes it possible to move the point of incidence 3i of the beam 3a-1 to points 3i-1 to 3i-3 that are spaced apart so as to create the weld zone 3 at the frustoconical contact surfaces 2-1 and 1-1, as shown in FIG. 5.

FIG. 5 shows in greater detail but diagrammatically the means for rotating R the mirror 4 relative to the longitudinal axis XX' of the tubes and the means for moving the mirror in translation T relative to the device 20, which means are included in the transparent inflation chamber 21 (not shown in FIG. 5). The mandrel 20a supports a motor 20b that drives rotation of a gear system driving the rotation R of the mirror 4 about the longitudinal axis XX'. More precisely, the motor 20b drives rotation of the gearwheel 20c, which drives rotation of a toothed wheel 19a relative to the same longitudinal axis XX' and secured to a rotary structure 19 containing said mirror and thus enabling said mirror to be rotated about the axis XX' by having a ball-bearing system 19c.

In FIG. 5, it can be seen that the mandrel 20a may support the laser head 3b, or else it may support the laser device 3d directly.

Furthermore, FIG. 5 shows an embodiment in which the rotation R of the mirror 4 relative to the longitudinal axis XX' of said tubes is combined with continuous relative movement in translation T in a longitudinal direction by using a wormscrew 18 that operates as follows. The toothed wheel 19a drives a second toothed wheel 19b in rotation about the same longitudinal axis XX', which second toothed wheel 19b co-operates with a gearwheel 18b that drives rotation of the wormscrew 18 about a longitudinal axis $X_1X_1'$ via a longitudinal shaft 18a. The wormscrew 18 co-operates with a mirror support 4b such that rotation of the wormscrew 18 about its axis $X_1X_1'$ leads to relative movement in translation of the support 4b of the mirror 4. The mirror 4 is thus moved in translation by the wormscrew 18, which is constrained to rotate with the rotation R, e.g. at a rate of 3 millimeters per revolution, where one revolution corresponds to one pitch step of the screw of a helical weld zone 3h as obtained in this way. It can be understood that the gearwheel 18b and the wormscrew 18 form part of the rotary structure driven in rotation about the axis XX' together with the support 4b and the mirror 4.

In an alternative embodiment (not shown), instead of a wormscrew 18, it is possible to use a stepper system for movement in relative translation in contrast to a continuous system, such that rotation of the gearwheel 18b leads to discontinuous movement and thus makes it possible to obtain parallel circular weld zones that are arranged side by side and spaced apart by a translation stepsize in the longitudinal direction XX' instead of a continuous weld zone in the form of a spiral or helix. Using movement in translation that is continuous, or that is in steps with a movement in translation steps of size corresponding to the width of the weld zone created by the width of the beam, makes it possible to obtain a weld zone 3 that extends over a continuous surface of revolution along the longitudinal direction of the movement in translation, as shown in FIG. 4.

Figure 6B:
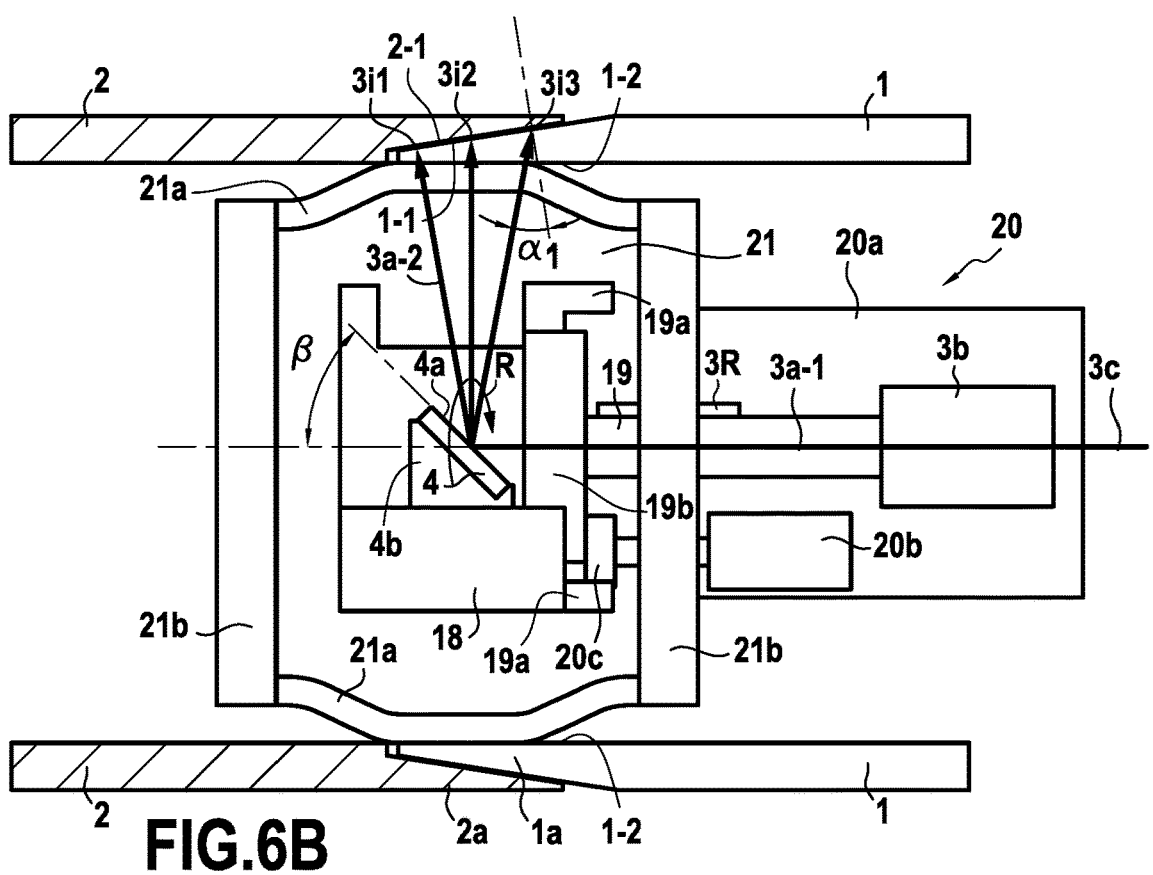
FIG. 6B is a longitudinal section view at the junction between two overlapping tubes contacting via frustoconical end contact surfaces and showing laser welding with a device 20 for performing an assembly method of the invention and involving rotating a mirror about the longitudinal axis XX' of said tubes in combination with varying the angle of inclination of the surface 4a of the mirror with an angle of inclination $\beta$ that is variable.

FIG. 6B shows an embodiment in which, instead of relative movement in translation T of the mirror 4 inside the inflation chamber 21, the angle of inclination β of the surface 4a of the mirror 4 is varied so that the reflected beam 3a-2 as deflected by the surface 4a of the mirror reaches the contacting surfaces 1-1 and 2-1 at an angle of inclination $\alpha_1$ lying in the range 0° to 30° relative to the perpendicular to said contact surfaces 1-1 and 2-1. The point of incidence 3i-1 corresponds to an angle of incidence $\alpha_1$ of 0°, the point 3i-2 to an angle of incidence $\alpha_1$ of 10°, and the point 3i-3 to an angle of incidence $\alpha_1$ of 30°. The means for varying the angle of inclination of the mirror 4a may be constrained to move with the rotation R of the mirror about the axis XX' by equivalent means involving a gearing system and a wormscrew 18. For example, a wormscrew 18 may be used that meshes on an angle takeoff gear system with an outlet gearwheel of axis perpendicular to the axis of the wormscrew 18 and co-operating with a gearwheel of the mirror support driving the angle of inclination of the mirror as a result of the rotation of the mirror about the longitudinal axis XX' of said tube. The wormscrew 18 may be driven in rotation in the same manner as in the embodiment of FIG. 5. By way of example, the angle β of the surface 4a of the mirror relative to the axis XX' may be caused to vary through ±5°, said variation in the angle of inclination being driven by the rotation R of the mirror at 0.5° per revolution so as to obtain a weld zone 3h of spiral or helical shape. Alternatively, it is possible once more to implement a plurality of parallel circular weld zones that are side by side, by making use of discontinuous variations in angle of inclination, obtained by using a spring and cam system serving to actuate a lug for triggering stepped angular changes of said angle of inclination, e.g. by 0.5° per step. The disclosed method makes it possible to obtain weld zones of excellent quality that are very strong with a weld width corresponding to the width of the laser beam, which is 2 mm to 3 mm along the axis XX', thus making it possible to weld tubes having thicknesses up to 25 mm, and more particularly tubes having thicknesses in the range 1 mm to 25 mm. It is thus possible to make a weld zone that extends in the axial direction by using a helical zone made up of a plurality of discontinuous circles side by side, e.g. at a spacing of 5 mm, with the zones together extending over a distance of 20 mm to 50 mm in the axial direction XX'.

Figure 7:
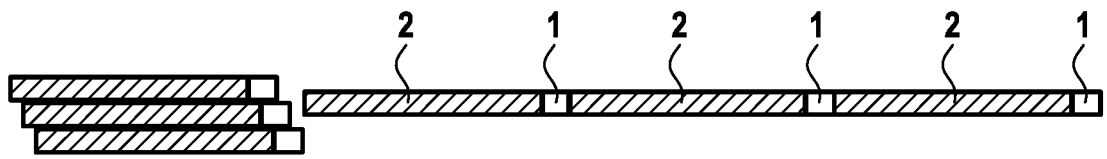
FIG. 7 shows a liner tube being made by assembling together end-to-end long lengths of absorbent liner tubes 2 and short lengths of transparent liner tubes 1.

FIG. 7 shows long absorbent tubes 2 being assembled end-to-end together with short transparent tubes 1 via annular plane frontal end surfaces lying in planes that are perpendicular to the longitudinal axis XX'.

Figure 8:
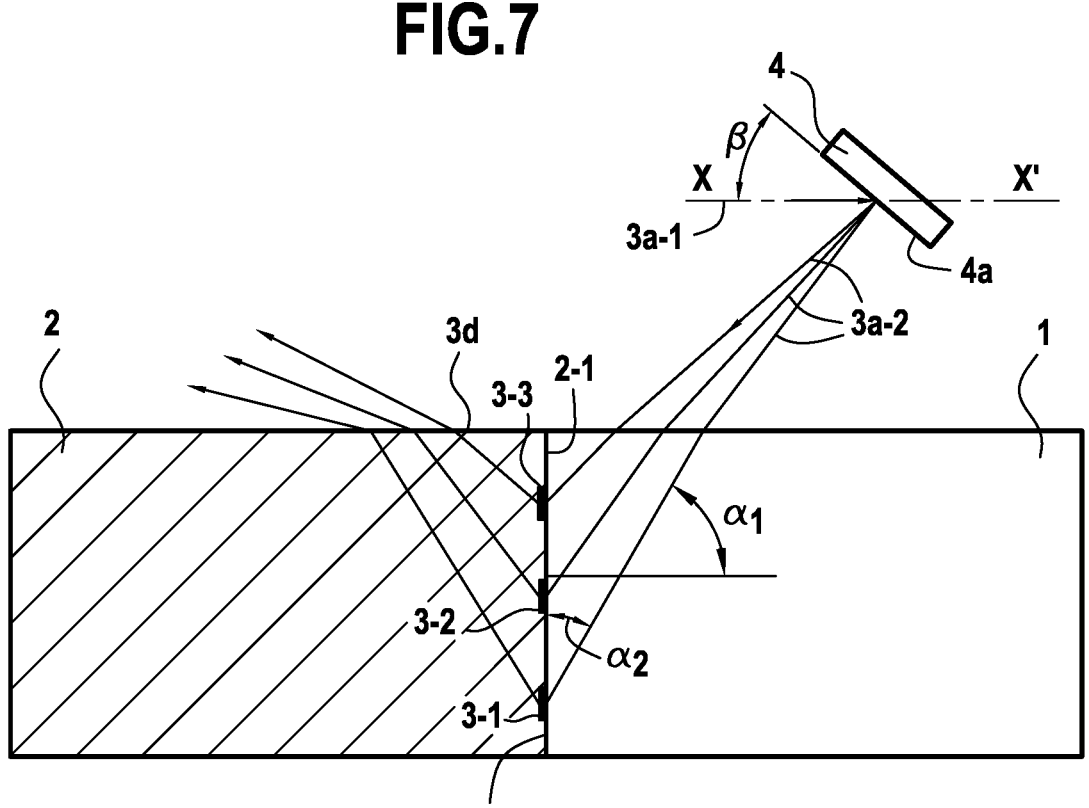
FIG. 8 shows details of the laser welding at the plane annular surfaces pressed end-to-end one against the other of said absorbent tubes and said transparent tubes.

FIG. 8 shows a plurality of concentric circular weld zones 3-1, 3-2, and 3-3 being made by varying the angle of inclination β of the surface 4a of the mirror 4 relative to the longitudinal axis XX' of the tubes 1 and 2. Varying the angle of inclination β involves varying the angles $\alpha_1$ and $\alpha_2$ of the incident beam 3a-2, $\alpha_1$ relative to the longitudinal axis XX' which is itself perpendicular to the frontal plane contact surfaces 1-1 and 2-1, and $\alpha_2$ relative to the frontal plane contact surfaces 1-1 and 2-1 that are perpendicular to the axis XX'. Because of the plurality of circular weld zones 3-1, 3-2, 3-3, a weld is thus obtained that occupies 60% to 90% of the thickness of the tubes 1 and 2.

Figure 9:
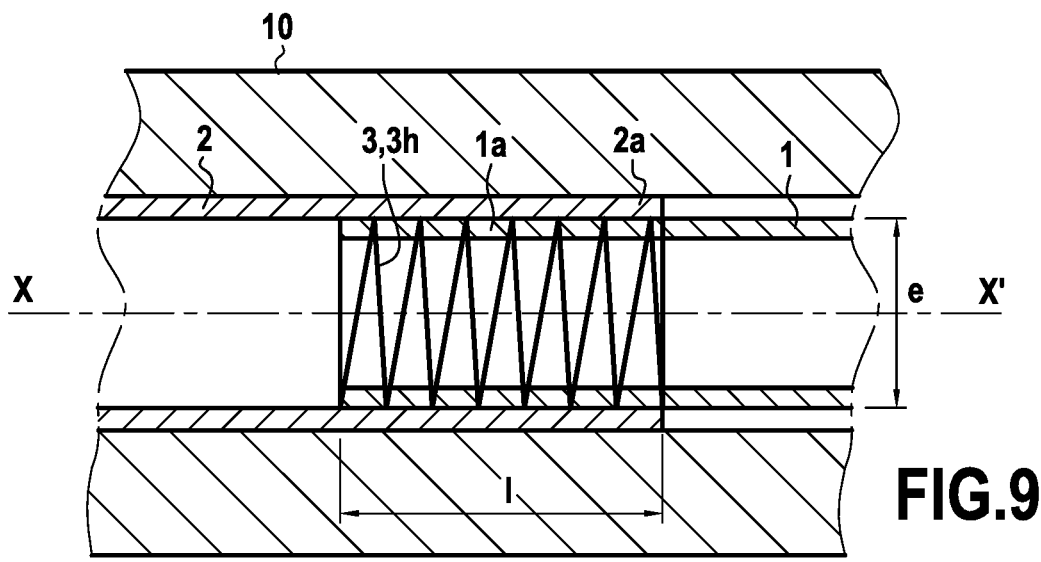
FIG. 9 is a diagram showing an embodiment in which a transparent sleeve tube 1 is placed inside an absorbent liner tube 2 of a pipe 10, showing diagrammatically a helical weld zone 3h between the transparent tube 1 and the absorbent tube 2, said laser welding being performed from inside the transparent tube 1.

FIG. 9 shows an implementation in which the transparent tube or sleeve 1 is placed inside the opaque absorbent tube or liner 2 for a pipe 10 to which it is to be assembled by laser welding via their non-machined cylindrical terminal portions or ends 1a, 2a that are of constant thickness, which is preferably not greater than 5 mm, which terminal portions or ends are superposed and overlap over a distance $\lambda=2$ mm to 5 mm. A continuous helical weld zone 3h is made using a laser beam device rotating about and relative to the axis XX' inside the transparent tube 1 so that the laser beam passes initially through the inner transparent portion before being reflected on the outer absorbent portion. In this embodiment, the weld zone comprises turns of constant diameter since said contact surfaces are cylindrical.

In contrast, in an implementation in which the contact surfaces 1-1 and 1-2 are frustoconical surfaces of revolution, as shown in FIGS. 4 and 6, the weld zone is spiral in shape with turns of increasing diameter, starting from the turn going through the point 3i-1 corresponding to the turn of smallest diameter to the point 3i-3 corresponding to the turn of greatest diameter, the envelope surfaces of said weld zones then being surfaces that are frustoconical and not cylindrical.

FIGS. 10 to 15 show the various steps of installing a tubular junction sleeve 1 in an end of a pipe element $10_1$ using a device 20 for putting the sleeve into place. These operations may be performed on land or on the deck of the ship 100 while in a horizontal position.

A device 20 of the invention for putting a sleeve 1 into place is shown in FIGS. 11 to 15 as having a mandrel 20a of cylindrical shape extending in an axial longitudinal direction XX' and having a longitudinal cylindrical central orifice within which there is placed an umbilical 20d that also serves as a cord for handling the device 20.

In FIGS. 10 to 21, the device 20 comprises a first inflatable chamber 21 having a transparent wall 21a, the device being fitted with the mirror 4 and with means for moving the mirror in translation and/or in inclination as described above, said chamber being arranged in the longitudinal direction XX' at a distance d from a second inflatable chamber 22.

The first and second chambers are spaced apart by a distance d such that when the second chamber 22 is arranged facing the constricted central portion 1c of the sleeve, the first chamber 21 is arranged facing one end of the sleeve in register with its terminal portion 1a of reduced thickness.

Figure 11:
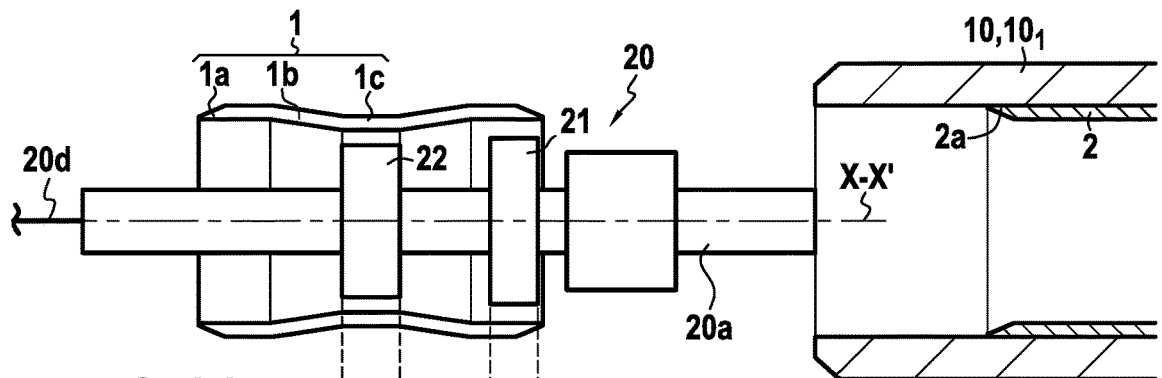
FIGS. 11 to 15 show various steps of putting into place and laser welding the sleeve 1 at one end of a pipe element by using a device of the present invention, as shown diagrammatically.
Figure 12:
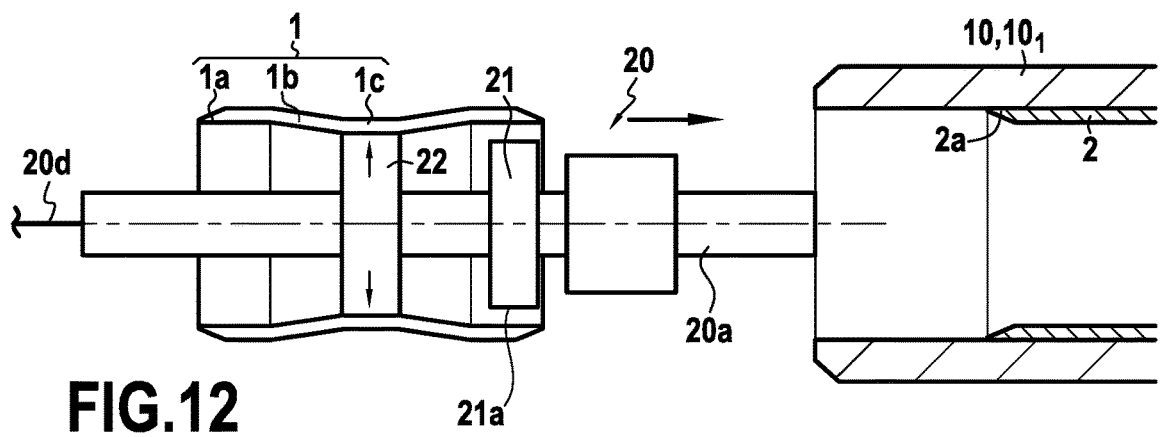
Figure 13:
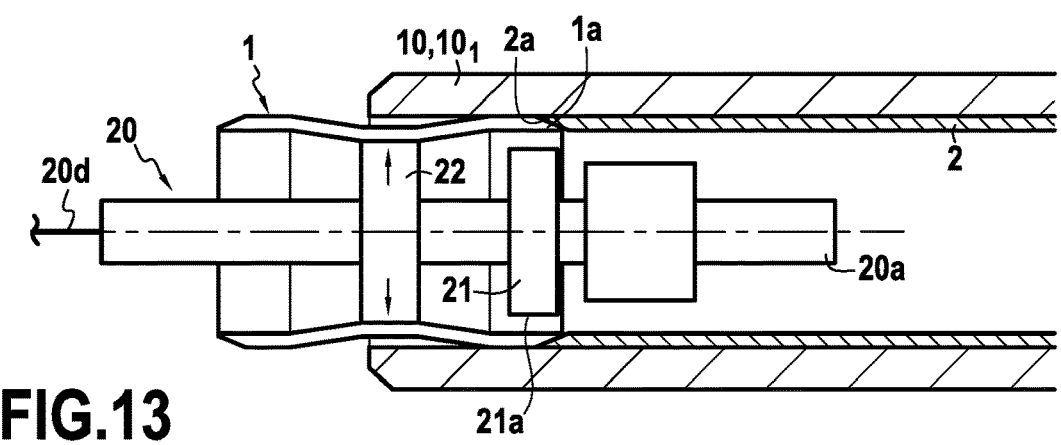
Figure 14:
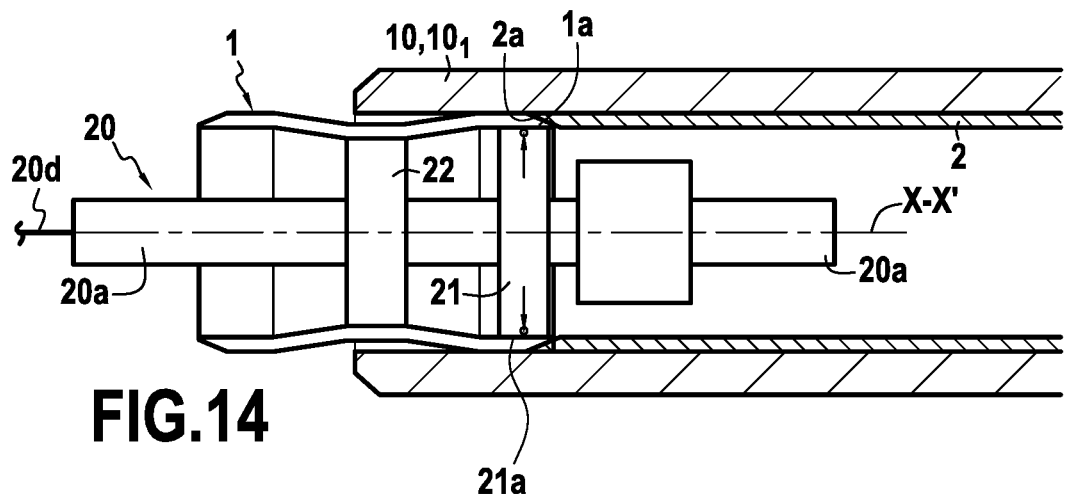
Figure 15:
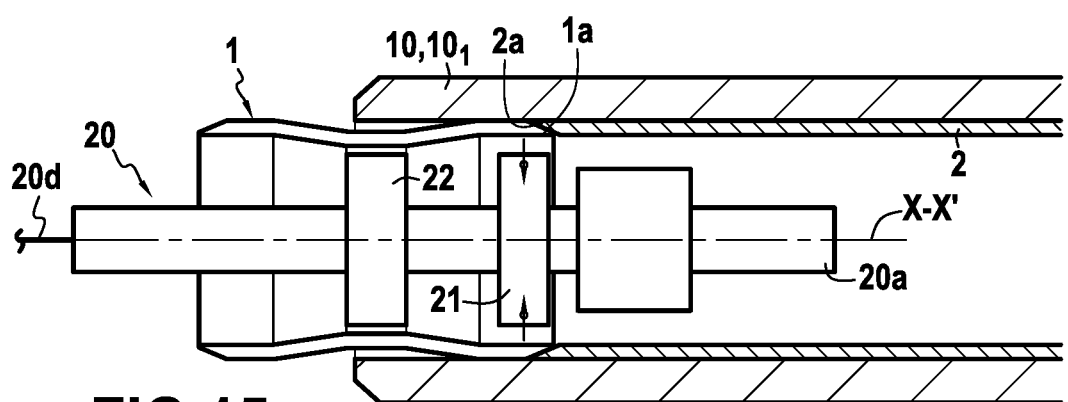

In FIGS. 11 and 12, a device 20 of the present invention for putting a sleeve into place is inserted in such a manner that, as can be seen in the figure, when the second inflatable chamber 22 is fully inflated, it presses against the wall of the constricted central portion 1b of the sleeve 1. The assembly comprising the device 20 and the sleeve 1 is thus held together and can be moved in horizontal translation towards the open end without a sleeve of a pipe element $10_1$ until it comes into abutment against the end 2a of the liner 2 of the pipe element $1_1$ as shown in FIG. 13. At this moment, and as shown in FIG. 14, the transparent wall 21a of the first inflatable chamber 21 faces the frustoconical contact surfaces 1-1, 1-2 at one end of the sleeve, as shown in FIGS. 13 and 14. At this stage, the first inflatable chamber 21 can be inflated so as to press against the terminal portion 1a of the sleeve in abutment against the end 2a of the liner, and the laser beam 3a is delivered so as to melt the zone of the contact surfaces 1-1, 2-1 of the sleeve and of the liner 2, thereby enabling laser welding to be performed by melting the zone of the contact plane between the tubular junction sleeve 1 at its end 1a and the end 2a of the liner 2 by passage of the laser beam 3a, as described above. The first chamber 21 is expanded with pressure that serves to guarantee excellent compactness in the melt plane and the absence of any bubbles of air that would be harmful to obtaining good sealing at the melt surface.

Thereafter, in order to perform the steps of inspecting the quality of the weld, the first chamber 21 is deflated into a deflated position relatively close to the walls of the sleeve, and an inspection laser beam is sent to the weld zone so that the beam reflected on the weld zone can be analyzed using a sensor 3r situated in the first chamber.

Advantageously, this guidance can be performed manually or by means of a carriage or of other means for guiding movement in longitudinal translation.

Once the weld has been inspected, it is possible to remove the device 20 in translation after previously deflating all of the inflatable chambers. Said first and second inflatable chambers 21 and 22, in the deflated position, remain relatively close to the walls of the sleeve such that the device 20 can be guided relatively easily in longitudinal translation inside the sleeve. Advantageously, this guidance can be performed manually or by means of a carriage or by other means for guiding movement in longitudinal translation.

A pipe element $10_1$ fitted at one of its ends with a tubular junction sleeve 1 forming a male portion is thus ready for laying, which male portion can be engaged in the female portion without a tubular junction sleeve of a second pipe element.

Figure 10:
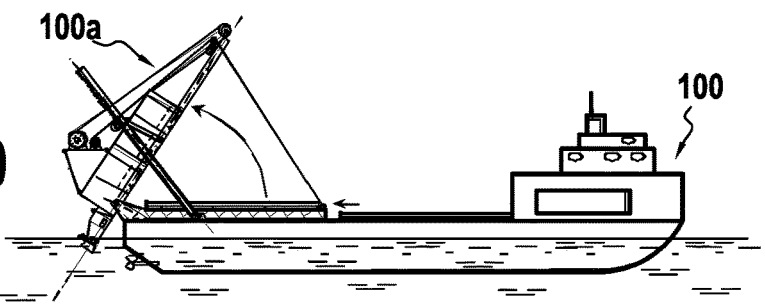
FIG. 10 is a side view of an installing ship fitted with a so-called "J-lay" tower.

FIGS. 16 to 22 show two unit lengths of lined pipe being assembled together during installation on site that is performed on board a pipe-laying ship 100 fitted with a J-lay tower 100a, as shown in FIG. 10. A new lined pipe element $10_1$ fitted with a tubular sleeve 1 at one of its ends is transferred in known manner from the horizontal position to an oblique position corresponding to the angle of inclination of the tower so as subsequently to be positioned on the axis of the terminal pipe element $10_2$ at the end of the string that is being laid. Said pipe element $10_1$ for assembling is then moved axially towards the suspended terminal pipe element $10_2$. A portion of the sleeve 1 forming a male end of one of the two pipe elements then penetrates into the female end without a sleeve of the other pipe element that is to be assembled therewith, until the terminal portion 1a of the sleeve comes into contact with the terminal portion 2a of the liner 2 inside the other pipe element $10_1$. Since the two pipe elements are close to being vertical, a manipulator arm enables the terminal portion 1a of the sleeve to become fully inserted against the terminal portion of the liner in order to reach the configuration of FIG. 23 where the two pipe elements $10_1$ and $10_2$ are held apart by a few millimeters, e.g. using the same manipulator arm (not shown), so as to make it possible in known manner to make the weld 11 by means of an orbital welding robot known to the person skilled in the art. The figures show the chamfered steel pipe walls spaced apart by a few millimeters while they are being welded together, the screen 13 constituted by a mattress of ceramic foam serving to limit the transfer of heat and protecting the thermoplastic sleeve throughout the duration of the welding process. On the right-hand side, the weld 11 is shown as being terminated.

In an implementation shown in FIGS. 16 to 22, a new terminal pipe element $10_1$ is fitted with a tubular junction sleeve 1 at its bottom end, thus forming a male end that is lowered towards the female top end of a first pipe element $10_1$ that does not have a sleeve and that forms the top terminal pipe element of a pipe that is being laid and that is held securely in suspension from the bottom of the tower.

In a first step, the device 20 for putting the sleeve into place is lowered by the umbilical 20d so that the first inflatable chamber 21 is positioned facing the terminal portion 1a of the bottom end of the sleeve 1 and the terminal portion 1a. The second inflatable chamber 22 is thus facing the central junction 1c of the sleeve 1, as shown in FIG. 17. At this moment, the second chamber 22 is inflated so as to secure the device 20 with the sleeve 1, the device 20 now being lowered together with the pipe element $10_1$ until the male end of the sleeve projecting from the end of the pipe element $10_1$ becomes engaged inside the non-lined female portion of the pipe element $10_2$, such that the terminal portion 1a of the sleeve 1 comes into abutment against the terminal portion 2a of the liner 2 of the pipe element $10_2$, as shown in FIG. 19.

Figure 20:
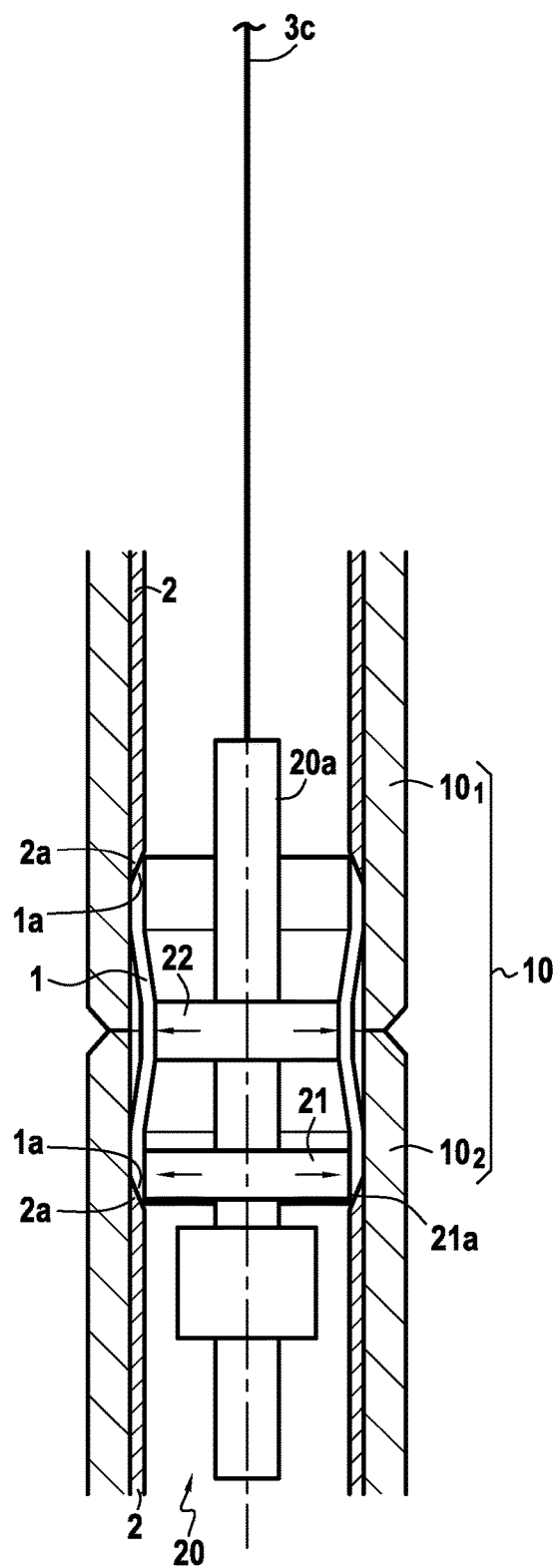
Figure 21:
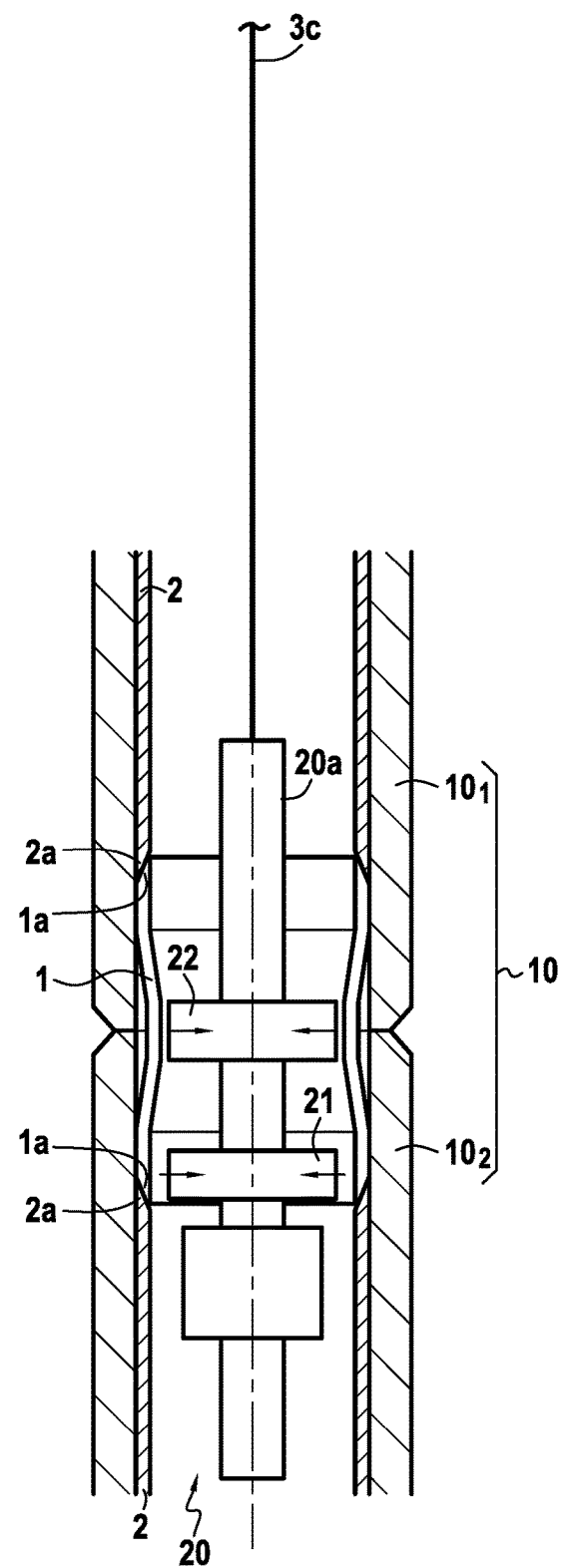
Figure 22:
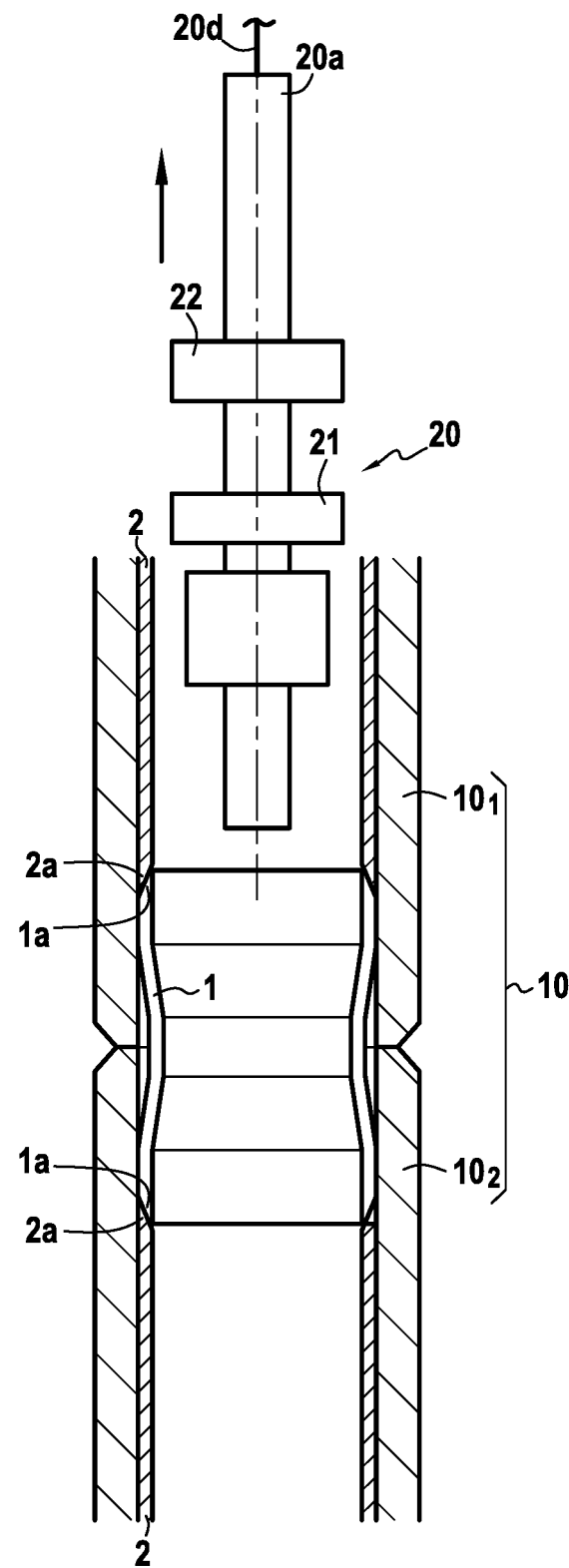

At this stage, FIG. 20, in order to obtain melting by laser welding, the first inflatable chamber 21 is inflated and the laser radiation is delivered so as to obtain melting in a weld zone 3 between the terminal portion 1a of the sleeve 1 and the terminal portion 2a of the liner 2, the optical fiber being conveyed in a pipe inside the umbilical 20d.

Thereafter, in order to inspect the weld by using an inspection laser beam, the two chambers 21 and 22 are partially deflated. The various inflatable walls 21, 22 can then be deflated and the device 20 can be raised for subsequent use in assembling a new pipe element.

Figure 23:
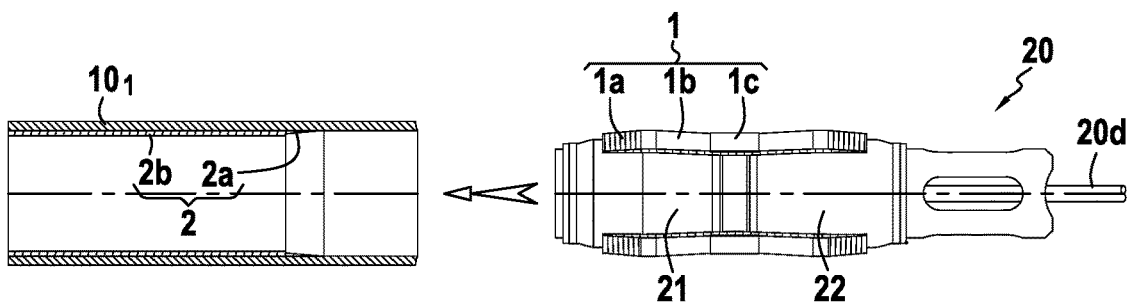
FIGS. 23 and 24 show a device 20 for putting a sleeve into place and having two chambers that are suitable for performing laser welding.
Figure 24:
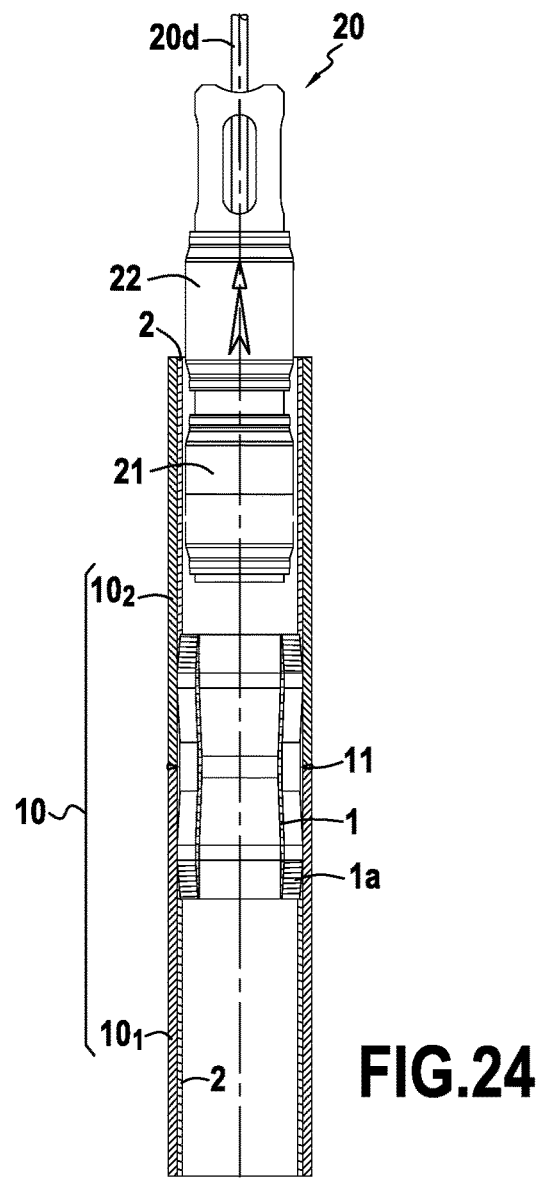

FIGS. 23 and 24 show an embodiment in which the two chambers 21 and 22 are fitted with transparent walls placed in such a manner that they can be positioned simultaneously facing the two ends 1a of the same sleeve 1, the assembly comprising the two chambers 21 and 22 being of a length that is longer than the sleeve 1 so that the two chambers can coincide and press against both ends 1a of the sleeve simultaneously.

Alternatively, it is possible to lower a new pipe element $10_2$ that is already fitted with a tubular junction sleeve 1 at its top end, but having its bottom end without a sleeve so as to form a female end of said new pipe element lowered towards the male top end of a first pipe element $10_1$ fitted with a tubular junction sleeve 1 at its top end, the first pipe element $10_1$ forming the top terminal pipe element of a pipe that is being laid and that is held securely suspended from the bottom of the tower.

The invention claimed is:

1. A method of assembling a sleeve to a liner comprising:
providing a laser device configured to emit a laser beam having a wavelength;
providing a sleeve comprising a thermoplastic material, wherein the sleeve a is transparent to the wavelength of the laser beam, and wherein the sleeve is tubular;
providing a first steel pipe comprising:
an inner surface and a first end;
a first liner which covers a lined portion of the inner surface of the first steel pipe, wherein the first liner comprises a thermoplastic material, and wherein the first liner is absorbent to the wavelength of the laser beam; and
an unlined portion adjacent the first end of the first steel pipe where the inner surface of the first steel pipe is not covered by the first liner, wherein a first end of the first liner is adjacent the unlined portion of the first steel pipe;
providing a second steel pipe comprising:
an inner surface and a second end;
a second liner which covers a lined portion of the inner surface of the second steel pipe, wherein the second liner comprises a thermoplastic material, and wherein the second liner is absorbent to the wavelength of the laser beam; and
an unlined portion adjacent the second end of the second steel pipe where the inner surface of the second steel pipe is not covered by the second liner, wherein a second end of the second liner is adjacent the unlined portion of the second steel pipe;
inserting a first end of the sleeve into the first end of the first steel pipe such that the first end of the sleeve contacts the first end of the first liner and inserting a second end of the sleeve into the second end of the second steel pipe such that the second end of the sleeve contacts the second end of the second liner, wherein the inserting steps coaxially align the sleeve, the first steel pipe and the second steel pipe relative to a common longitudinal axis;
applying pressure to an inner surface of the sleeve in a radial direction, wherein the pressure is applied at the first end of the sleeve;
emitting the laser beam from the laser device;
directing the laser beam toward the inner surface of the sleeve at the first end of the sleeve and rotating the laser beam about the common longitudinal axis through 360°;
wherein, during the step of directing the laser beam:
the laser device is arranged inside the sleeve or the first liner;
the step of applying pressure is simultaneously performed;
the laser beam passes firstly through the first end of the sleeve in order to reach a zone of contact between the first end of the sleeve and the first end of the first liner;
respective contacting surfaces of the first end of the sleeve and the first end of the first liner are pressed against each other; and
the first end of the sleeve is fused to the first end of the first liner to form a first weld zone.

2. The method according to claim 1, wherein the first and second liners and the sleeve each have a thickness that is less than or equal to 5 mm.

3. The method according to claim 1, wherein:
the first end of the first liner has a constant thickness and defines a cylindrical inner surface having a first diameter;
the first end of the sleeve has a constant thickness and defines a cylindrical outer surface which has a diameter equal to the first diameter;
in the step of inserting the first end of the sleeve into the first end of the first steel pipe, the first end of the sleeve is positioned in an overlapping manner with the first end of the first liner; and
the respective contacting surfaces of the first end of the sleeve and the first end of the first liner comprise the cylindrical inner surface of the first end of first liner and the cylindrical outer surface of the first end of the sleeve.

4. The method according to claim 1, wherein:
the first end of the first liner has a thickness which is smaller than a thickness of a main portion of the first liner and defines a concave portion of an inner surface of the first end of the first liner, the concave portion having an inner diameter that is greater than an inner diameter of the main portion of the first liner;
the first end of the sleeve has a thickness which is smaller than a thickness of a main portion of the sleeve, the first end of the sleeve defining a convex portion suitable for overlapping and abutting against the concave portion of the first end of the first liner;
in the step of inserting the first end of the sleeve into the first end of the first steel pipe, the concave portion of the first end of the first liner is positioned in an overlapping and abutting manner with the convex portion of the first end of the sleeve; and
the respective contacting surfaces of the first end of the sleeve and the first end of the first liner comprise the concave portion of the first end of the first liner and the convex portion of the first end of the sleeve.

5. The method according to claim 1, wherein the first weld zone is a continuous weld zone having a helical shape or the first weld zone comprises a plurality of adjacent circular weld zones.

6. The method according to claim 1, wherein:
the step of directing the laser beam toward the inner surface of the sleeve is performed by:
directing the laser beam in a longitudinal direction parallel to the common longitudinal axis to a mirror in such a manner that a surface of the mirror reflects the laser beam toward the inner surface of the sleeve, the surface of the mirror being inclined at an angle of inclination relative to the common longitudinal axis, wherein the angle of inclination is from 30° to 60°, and
rotating the mirror through 360° about the common longitudinal axis.

7. The method according to claim 6, wherein the mirror is rotated at a speed of 10 revolutions per second to 1 revolution every 10 seconds.

8. The method according to claim 6, wherein during the step of directing the laser beam toward the inner surface of the sleeve the mirror is additionally moved in the longitudinal direction.

9. The method according to claim 8 wherein the steps of rotating the mirror and moving the mirror in the longitudinal direction are performed simultaneously such that the first weld zone is formed with a helical shape.

10. The method according to claim 6, wherein the angle of inclination is variable and is changed during the step of directing the laser beam toward the inner surface of the sleeve.

11. The method according to claim 10, wherein during the step of directing the laser beam toward the inner surface of the sleeve, the angle of inclination is changed after rotating the mirror about the common longitudinal axis through 360°, such that the first weld zone is a circular weld zone, and successive steps of rotating the mirror through 360° about the common longitudinal axis and subsequently changing the angle of inclination are repeated in order to make a additional circular weld zones.

12. The method according to claim 1, wherein in the step of directing the laser beam toward the inner surface of the sleeve, the laser beam is directed perpendicular to the respective contacting surfaces, or is inclined at an angle of 0° to 30°, relative to a perpendicular to the respective contacting surfaces.

13. The method according to claim 1, further comprising forming the first liner by performing steps of:
   positioning short lengths of transparent first tubes and long lengths of absorbent second tubes in an alternating manner such that each first tube meets an adjacent second tube at a respective annular contact plane, wherein each of the first and second tubes is positioned coaxially relative to a common first liner axis,
   positioning a laser head inside at least one of the first and second tubes,
   for each respective annular contact plane, emitting a laser beam from the laser head, the laser beam being inclined relative to the common first liner axis and being directed at a respective annular contact plane to form a fusion weld at the respective annular contact plane.

14. The method according to claim 12, wherein the respective contacting surfaces are cylindrical or frustoconical in shape.

15. The method according to claim 1, wherein the laser beam has an energy of 1 W/mm$^2$ to 5 W/mm$^2$.

16. The method according to claim 1, wherein further comprising:
   inspecting a quality of the first weld zone by directing an inspection laser beam onto the first weld zone using the laser device, and using a sensor to measure an amount of absorption by detecting light reflected from the first weld zone, the inspection laser beam having lower energy than the laser beam used to form the first weld zone, and the inspection laser beam having the same wavelength as the wavelength of the laser beam used to form the first weld zone.

17. A method of assembling pipes comprising:
   a) providing a sleeve comprising a thermoplastic material, wherein the sleeve is transparent to a wavelength of a laser beam, and wherein the sleeve is tubular;
   b) providing a first steel pipe comprising:
      an inner surface and a first end;
      a first liner which covers a lined portion of the inner surface of the first steel pipe, wherein the first liner comprises a thermoplastic material, and wherein the first liner is absorbent to the wavelength of the laser beam; and
      an unlined portion adjacent the first end of the first steel pipe where the inner surface of the first steel pipe is not covered by the first liner, wherein a first end of the first liner is adjacent the unlined portion of the first steel pipe;
   c) providing a second steel pipe comprising:
      an inner surface and a second end;
      a second liner which covers a lined portion of the inner surface of the second steel pipe, wherein the second liner comprises a thermoplastic material, and wherein the second liner is absorbent to the wavelength of the laser beam; and
      an unlined portion adjacent the second end of the second steel pipe where the inner surface of the second steel pipe is not covered by the second liner, wherein a second end of the second liner is adjacent the unlined portion of the second steel pipe;
   d) providing a welding device comprising:
      a mandrel comprising a central axis;
      an umbilical connected to the mandrel, the umbilical comprising optical fibers, electrical power supply circuits, and a compressed air feed circuit;
      a laser device configured to emit the laser beam, wherein the laser beam has the wavelength and the laser device is mounted to the mandrel;
      a mirror mounted to the mandrel wherein the mirror is mounted for rotation about the central axis and translation in a direction parallel to the central axis, and the mirror is mounted such that an angle of inclination between the mirror and the central axis can be changed;
      a first inflatable chamber comprising a first internal space and a first peripheral wall, wherein the first peripheral wall is transparent to the wavelength, the first peripheral wall is radially expandable by inflation of the first internal space, and the mirror is located within the first internal space;
      a second inflatable chamber comprising a second internal space and a second peripheral wall, wherein the second peripheral wall is radially expandable by inflation of the second internal space;
   e) inserting a first end of the sleeve into the first end of the first steel pipe such that the first end of the sleeve contacts the first end of the first liner and a second end of the sleeve protrudes from the first end of the first steel pipe;
   f) performing a first step of laser welding to weld the first end of the sleeve to the first end of the first liner;
   g) inserting the welding device into the sleeve such that the first inflatable chamber is arranged at the second end of the sleeve, and securing the welding device in place by inflating the second inflatable chamber against an inner surface of the sleeve;
   after or before performing step g) inserting and forcing the second end of the sleeve into the second end of the second steel pipe such that the second end of the sleeve contacts the second end of the second liner at respective contact surfaces;
   welding together the first end of the first steel pipe to the second end of the second steel pipe by metal welding around an outer surface of the first end of the first steel pipe and an outer surface of the second end of the second steel pipe;
   inflating the first inflatable chamber to apply pressure to the second end of the sleeve, emitting the laser beam from the laser device while simultaneously applying the pressure, and reflecting the laser beam with the mirror to direct the laser beam towards the second end of the sleeve and to create a weld zone by melting a portion of each of the respective contact surfaces of the second end of the sleeve and the second end of the second liner;
   inspecting a quality of the weld zone by directing an inspection laser beam onto the weld zone using the laser device and the mirror, and using a sensor to measure an amount of absorption by detecting light reflected from the weld zone; and deflating the first and second inflatable chambers and removing the welding device from the sleeve.

* * * * *